US011107166B2

(12) United States Patent
O'Hara et al.

(10) Patent No.: US 11,107,166 B2
(45) Date of Patent: Aug. 31, 2021

(54) MULTI-STEP DAY SALES OUTSTANDING FORECASTING

(71) Applicant: BUSINESS OBJECTS SOFTWARE LTD., Dublin (IE)

(72) Inventors: Paul O'Hara, Dublin (IE); Ying Wu, Maynooth (IE)

(73) Assignee: Business Objects Software Ltd., Dublin (IE)

( * ) Notice: Subject to any disclaimer, the term of this patent is extended or adjusted under 35 U.S.C. 154(b) by 136 days.

(21) Appl. No.: 16/140,760

(22) Filed: Sep. 25, 2018

(65) Prior Publication Data

US 2020/0098055 A1 Mar. 26, 2020

(51) Int. Cl.
*G06Q 40/00* (2012.01)
*G06N 5/04* (2006.01)
*G06Q 10/06* (2012.01)
*G06Q 30/02* (2012.01)

(52) U.S. Cl.
CPC .......... *G06Q 40/125* (2013.12); *G06N 5/046* (2013.01); *G06Q 10/063* (2013.01); *G06Q 30/0202* (2013.01)

(58) Field of Classification Search
CPC ........ G06F 9/505; G06N 20/00; G06N 5/046; G06N 7/00; G06Q 10/063; G06Q 40/125; G06Q 30/0202
See application file for complete search history.

(56) References Cited

U.S. PATENT DOCUMENTS

| 6,792,399 B1 * | 9/2004 | Phillips ................. G06Q 10/06 705/36 R |
| 7,725,335 B1 | 5/2010 | Goodwin |
| 2009/0157440 A1 | 6/2009 | Stone et al. |
| 2010/0161471 A1 * | 6/2010 | Fendick ................. G06Q 40/06 705/35 |

(Continued)

FOREIGN PATENT DOCUMENTS

WO  WO-2018118986 A1 *  6/2018 ......... G06Q 30/0201

OTHER PUBLICATIONS

Chen et al. Sales forecasting by combining clustering and machine-learning techniques for computer retailing. Neural Comput & Applic (2017) 28:2633-2647. (Year: 2017).*

*Primary Examiner* — Virpi H Kanervo
(74) *Attorney, Agent, or Firm* — Fish & Richardson P.C.

(57) ABSTRACT

Methods, systems, and apparatus, including computer programs encoded on a computer storage medium, to predict future Day Sales Outstanding (DSO) forecasts for a number of future time periods. In one aspect, a method includes receiving open receivables financial line item data and revenue financial line item data, providing the open receivables financial line item data to a DSO predictor engine to generate a predicted open receivables that includes a multi-step time series forecasting regression generated from the open receivables financial line item data, providing the revenue financial line item data to the DSO predictor engine to generate a predicted revenue comprising the multi-step time series forecasting regression generated from the revenue financial line item data; generating a predicted DSO with the predicted open receivables and predicted revenue, and providing the predicted DSO to a client device.

16 Claims, 18 Drawing Sheets

(56) References Cited

U.S. PATENT DOCUMENTS

| | | | |
|---|---|---|---|
| 2015/0363888 A1* | 12/2015 | Chopra | G06Q 40/12 |
| | | | 705/30 |
| 2019/0188536 A1* | 6/2019 | Lei | G06Q 30/0202 |
| 2019/0188611 A1* | 6/2019 | Wu | G06Q 10/04 |
| 2020/0082316 A1* | 3/2020 | Megahed | G06F 9/505 |

* cited by examiner

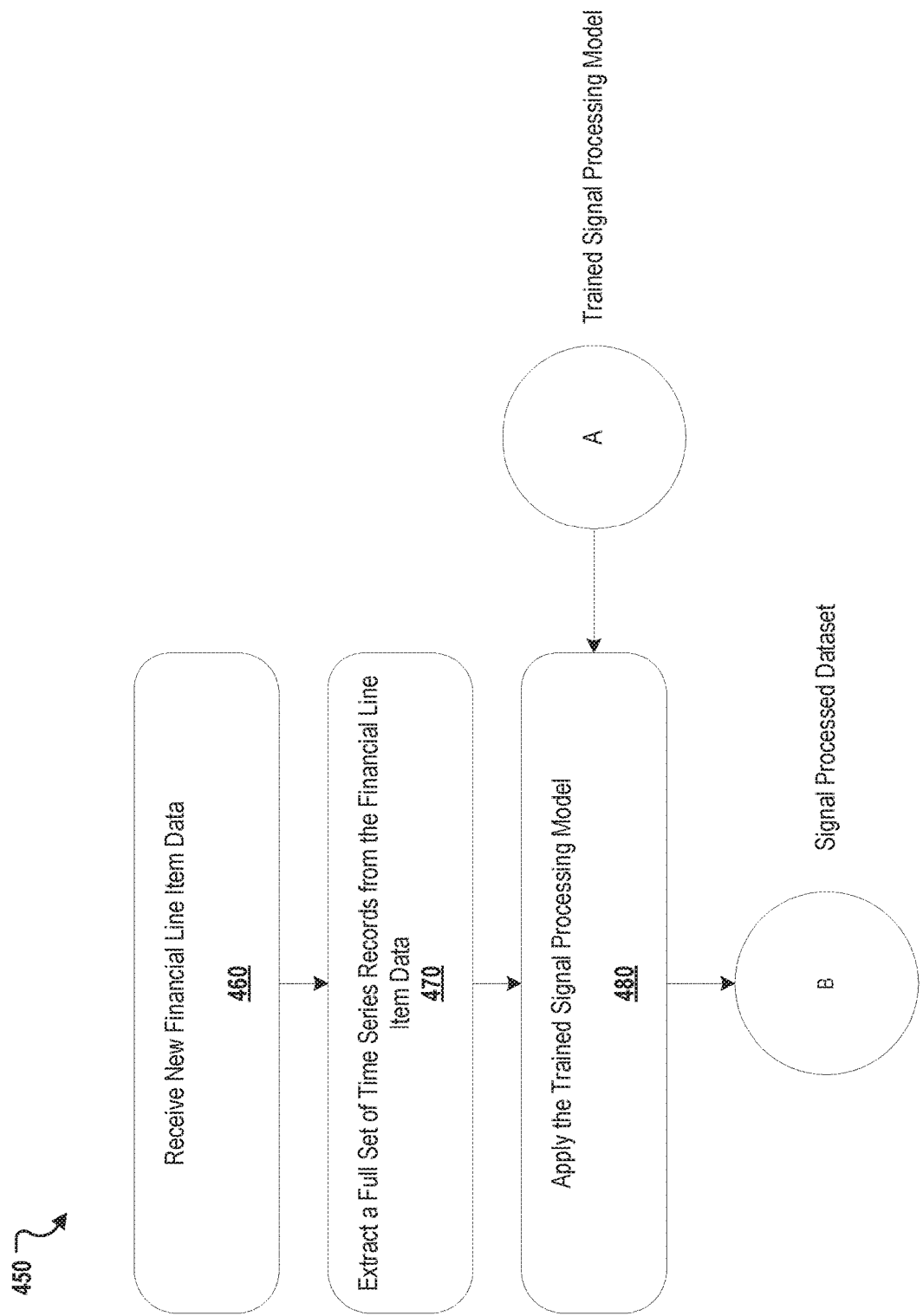

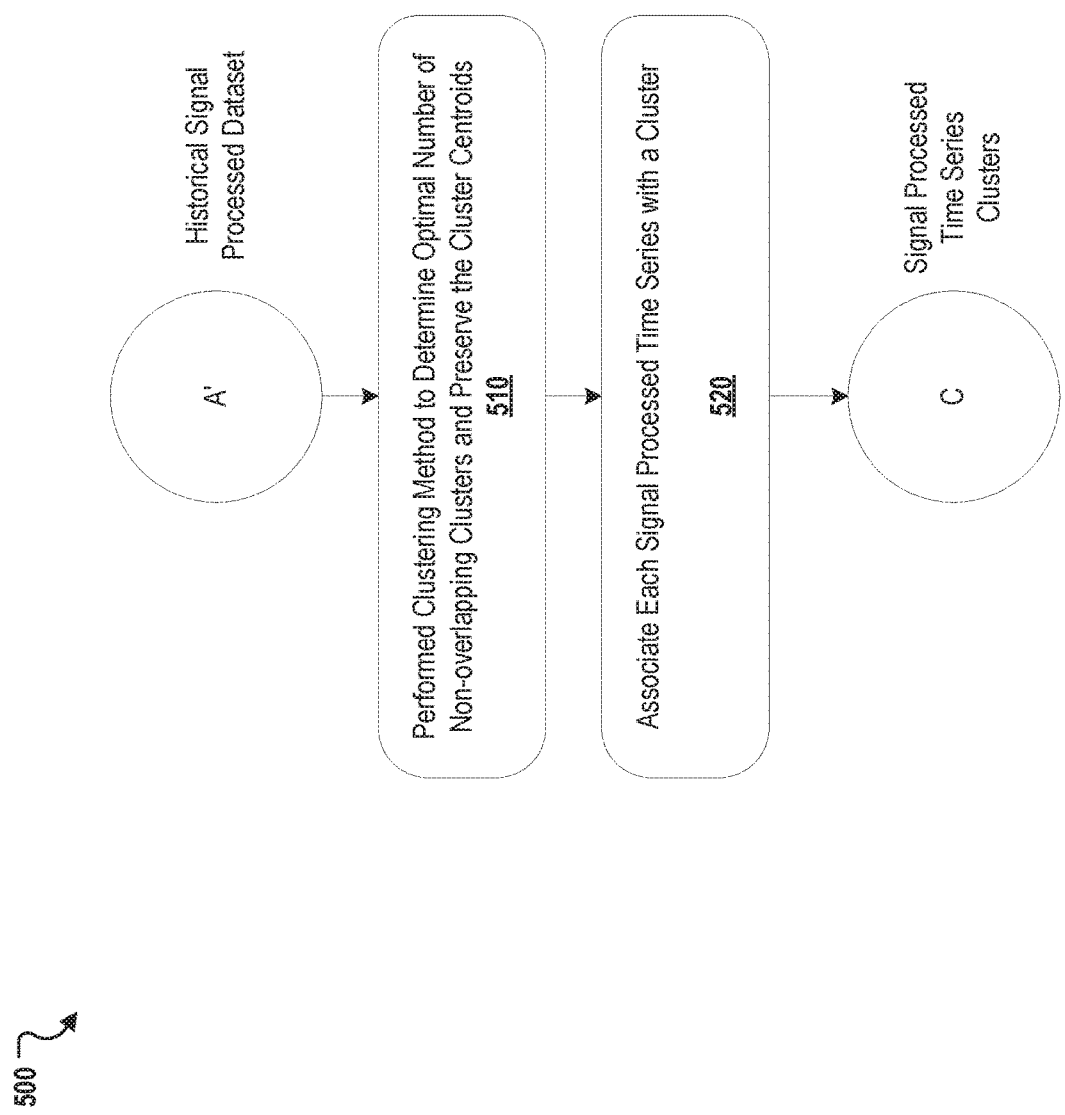

MULTI-STEP DAY SALES OUTSTANDING FORECASTING

BACKGROUND

The subject matter of machine learning includes the study of computer modeling of learning processes in their multiple manifestation. In general, learning processes include various aspects such as the acquisition of new declarative knowledge, the devilment of motor and cognitive skills through instruction or practice, the organization of new knowledge into general, effective representations, and the discovery of new facts and theories through observation and experimentations. Implanting such capabilities in computers has been a goal of computer scientist since the inception of the computer era. However, solving this problem has been, and remains, a most challenging goal in artificial intelligence (AI). Unlike human based decision, decision assistance systems embedded with machine learning algorithms are corruption free as thus are reliable. Achieving an understanding of historical data, the identification of trends, seasonal patterns, anomalies, emerging patterns, is time-consuming and prone to errors. Machine learning algorithms efficiently learn rules thus enabling the identification of these signals, and provide accurate predictions on future outcomes.

SUMMARY

Implementations of the present disclosure are generally directed to a system that predicts future Day Sales Outstanding (DSO) forecasts for N future time periods. DSO may be calculated monthly, quarterly, or yearly periods, using open receivables and revenue for an organization. Through increased reliability for forecasted future DSO trends, value is created for organizations providing a potential differentiating advantage over competitors.

In a general implementation, systems, apparatus, and methods for generating a predicted DSO include receiving open receivables financial line item data and revenue financial line item data. The open receivables financial line item data is provided to a DSO predictor engine to generate a predicted open receivables comprising a multi-step time series forecasting regression generated from the open receivables financial line item data. The DSO predictor engine performs operations comprising: receiving financial line item data; extracting item features from the financial line item data; generating a signal processed time series by applying a signal processing model to identify patterns within the financial line item data and transform the financial line item data in a lower-dimensional space, the signal processing model trained using a historical time series; clustering each of the signal processed time series to an optimal non-overlapping cluster; and generating the multi-step time series forecasting regression by applying a regression model to each future time point in each of the optimal non-overlapping clusters to predict a time series value for each future time point. The revenue financial line item data is provide to the DSO predictor engine to generate a predicted revenue comprising the multi-step time series forecasting regression generated from the revenue financial line item data. A predicted DSO is generated based on the predicted open receivables and predicted revenue. The predicted DSO includes a vector of final DSO predictions for each future time point. The predicted DSO is provide to a client device.

In another general implementation, one or more non-transitory computer-readable storage media coupled to one or more processors and having instructions stored thereon which, when executed by the one or more processors, cause the one or more processors to receive open receivables financial line item data and revenue financial line item data. The open receivables financial line item data is provided to a DSO predictor engine to generate a predicted open receivables comprising a multi-step time series forecasting regression generated from the open receivables financial line item data. The DSO predictor engine performs operations comprising: receiving financial line item data; extracting item features from the financial line item data; generating a signal processed time series by applying a signal processing model to identify patterns within the financial line item data and transform the financial line item data in a lower-dimensional space, the signal processing model trained using a historical time series; clustering each of the signal processed time series to an optimal non-overlapping cluster; and generating the multi-step time series forecasting regression by applying a regression model to each future time point in each of the optimal non-overlapping clusters to predict a time series value for each future time point. The revenue financial line item data is provide to the DSO predictor engine to generate a predicted revenue comprising the multi-step time series forecasting regression generated from the revenue financial line item data. A predicted DSO is generated based on the predicted open receivables and predicted revenue. The predicted DSO includes a vector of final DSO predictions for each future time point. The predicted DSO is provide to a client device.

In yet another general implementation, a system includes one or more processors; and a computer-readable storage device coupled to the one or more processors and having instructions stored thereon which, when executed by the one or more processors, cause the one or more processors to receive open receivables financial line item data and revenue financial line item data. The open receivables financial line item data is provided to a DSO predictor engine to generate a predicted open receivables comprising a multi-step time series forecasting regression generated from the open receivables financial line item data. The DSO predictor engine performs operations comprising: receiving financial line item data; extracting item features from the financial line item data; generating a signal processed time series by applying a signal processing model to identify patterns within the financial line item data and transform the financial line item data in a lower-dimensional space, the signal processing model trained using a historical time series; clustering each of the signal processed time series to an optimal non-overlapping cluster; and generating the multi-step time series forecasting regression by applying a regression model to each future time point in each of the optimal non-overlapping clusters to predict a time series value for each future time point. The revenue financial line item data is provide to the DSO predictor engine to generate a predicted revenue comprising the multi-step time series forecasting regression generated from the revenue financial line item data. A predicted DSO is generated based on the predicted open receivables and predicted revenue. The predicted DSO includes a vector of final DSO predictions for each future time point. The predicted DSO is provide to a client device.

An aspect combinable with the general implementations, the operations comprise: calculating a distance between each of the signal processed time series and a centroid of each of the optimal non-overlapping clusters to determine the optimal non-overlapping cluster for each of the signal processed time series.

In an aspect combinable with any of the previous aspects, the operations comprise: recalibrating the optimal non-overlapping clusters by calculating a validity index and evaluating a compactness of each of the optimal non-overlapping clusters based on the validity indices.

In an aspect combinable with any of the previous aspects, the operations comprise: receiving historical financial line item data; extracting the historical time series from the historical financial line item data; and training the signal processing model with the historical time series.

In an aspect combinable with any of the previous aspects, each of the processed time series has the same segment length as the historical time series.

In an aspect combinable with any of the previous aspects, the operations comprise: generating a signal processed historical dataset by transforming the historical time series to another lower-dimensional space of features.

In an aspect combinable with any of the previous aspects, the operations comprise: clustering the signal processed historical dataset to determine the optimal non-overlapping clusters and preserve the centroids for each of the optimal non-overlapping clusters. Each signal processed historical financial line item from the signal processed historical dataset is associated with one of the optimal non-overlapping clusters.

In an aspect combinable with any of the previous aspects, receiving historical financial line item data; extracting historical financial line item features from the historical financial line item data; clustering each of the historical financial line item features to one of the optimal non-overlapping cluster; and generating the regression model for each future time point. A time series of past time points are used as input data and actual values corresponding to current future time point are used as target data.

In an aspect combinable with any of the previous aspects, DSO is a Key Performance Indicator (KPI) that measures an average number of days taken by an organization to collect payment after a sale is made.

In an aspect combinable with any of the previous aspects, the open receivables financial line item data includes open receivables that represent sales posted before an end of a selected period that remained open, and revenue financial line item data includes revenue represents sales posted before the end of the selected period including the sales that remained open.

Particular implementations of the subject matter described in this disclosure can be implemented so as to realize one or more of the following advantages. The described system improved future liquidity estimates and increase accuracy in the identification of potential customer bases with emerging or future credit problems. The described DSO forecasting system also provides for improved estimation of the DSO future trends, identifies speed at which customers will pay in the future as well as potential future credit issues of the organizations customer base. The described system can be employed to indicate a potential trend in an organizations collection process (increasing or decreasing) as an increasing trend may indicate potential deterioration, where a decreasing trend may indicate improvement It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 4A and 4B depicts flow diagrams of example processes that can be performed by an open receivable signal processing module.

FIGS. 5A and 5B depicts flow diagrams of example process that can be performed by an open receivable clustering module.

DETAILED DESCRIPTION

Figure 1:
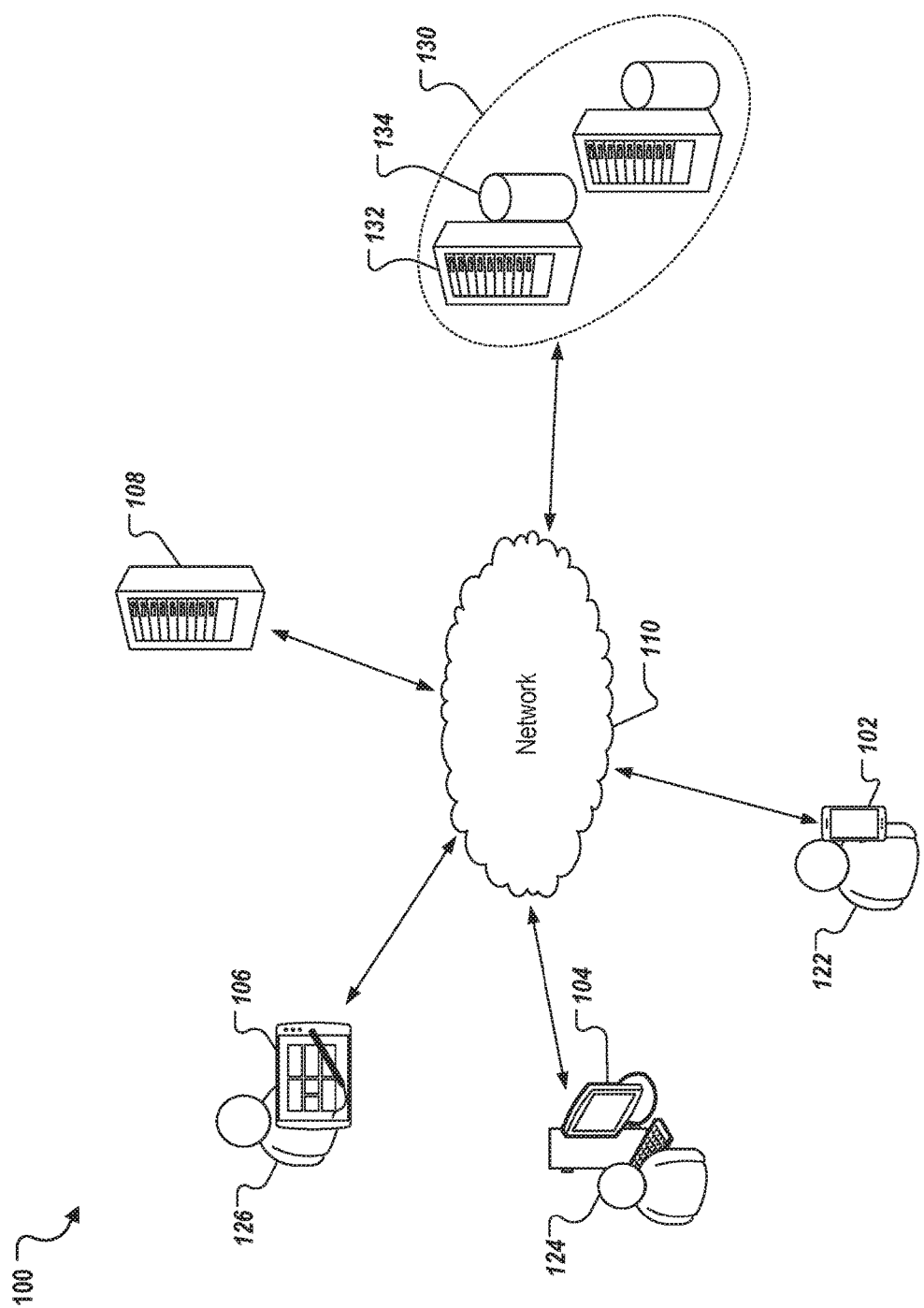
FIG. 1 depicts an example environment that can be employed to execute implementations of the present disclosure.

Implementations of the present disclosure are generally directed to DSO forecasting system. More particularly, implementations of the present disclosure are directed to a system that enables multi-step DSO forecasting to be performed for a single organization or an organization consisting of multiple organizations. In some implementations, the described DSO forecasting system includes a forecast delegator to assign financial line item data to a multiple or single organization branch, predictor branches to execute machine learning algorithms that produce internal open receivable and revenue forecast predictions, and a DSO calculator to combine the internal predictions to provide a DSO prediction.

With the availability of high volume, accurate historical records, and the quantitative nature of financial data, few industries are as openly compatible for machine learning integration. Moreover, the use of machine learning in finance applications is perpetuated by combining such financial data with increases in computer power. Furthermore, the integration of machine learning brings increased value and provides differentiating advantages.

Examples of the integration of machine learning financial systems include loan approval, automated trading, fraud detection, and decision making. In some implementation, the integration of machine learning with loan approval systems includes algorithms that are trained with, for example, customer data (e.g., age, job, marital status, and so forth) and/or financial lending results (repaid, defaulted, re-financed, and so forth) to detect anomalous trends and behaviors influencing the result of a loan application. In some implementations, integration of machine learning with automated trading systems enables fast trading decisions and thus provides the ability to make millions of transactions per day. Such trading systems may be employed by, for example, hedge funds or financial institutions.

In some implementations, machine learning is integrated within fraud detection systems and employed to actively learn and identify potential security. For example, the transitioning of organizational data to the cloud increases the amount of data that is stored online. Such architectures may increase a security risk for data access breaches. Traditional fraud detection systems depend heavily on complex and robust manually composed rules whereas systems that are integrated with machine learning go beyond such rules.

In some implementations, machine learning is integrated within decision making systems to assist, for example, executives and managers in achieving effective and efficient decision-making. For example, machine learning algorithms may be applied to historical financial data to identify behaviors and/or extract rules to enable future projections to be made on revenue or costs. Thus, facilitating a more informed and effective decision making process.

Examples where machine learning can be employed to enhanced decision making systems include marketing and capital optimization. Marketing decisions are complex and may involve an understanding of customer needs and desires along with the ability to identify changing customer behavior. Machine learning algorithms can trained with, for example, customer data to determine historical purchasing behavior and enable reliable customer insights, which may be subsequently employed within various decision-making processes. Capital optimization systems includes the maximization of profits and may rely heavily on mathematical approaches. Machine learning may be applied to such mathematical concepts to, for example, increase the efficiency, accuracy, and/or speed of capital optimization.

An area machine learning can be employed to assist in financial decision making for organizations is through the production of reliable and accurate predictions for future DSO trends. In some implementations, DSO is a KPI that measures the average number of days taken by an organization to collect payment after a sale is made. DSO may be calculated for monthly, quarterly, or yearly periods, using, for example, historical open receivables and revenue for an organization. Open receivables represent, for example, sales posted before the end of the selected period that remained open. Revenue represents, for example, sales posted before the end of the selected period, including those that remaining open.

The prediction of accurate and reliable future DSO trends is particularly useful. A high DSO figure can indicate, for example, an organization requires an extended period to convert open receivables to revenue and can imply, customers are taking increased time to make payments, customer satisfaction is declining, longer terms of payment are on offer from salespeople, driving increases in sales, customers with poor credit ratings are allowed to purchase on credit, potential future cash flow problems, and inefficient or ineffective management.

By providing increased forecast accuracy of future DSO trends, value is created for organizations by providing a potential differentiating advantage over competitors. Examples of such added value include: improved estimates of future liquidity, increased accuracy in the identification of potential customer bases with emerging or future credit problems, improved estimation of the DSO future trend, increased speed to identify what customers will pay in the future, identification of potential future credit issues of the organizations customer base, and indications of potential trends in an organizations collection process (e.g., is it increasing or decreasing). For example, an increasing value for a predicted future DSO trend may indicate potential deterioration, where a decreasing value would indicate improvement.

In some implementations, for depicting the DSO trend over time, the DSO may be calculated separately for each time period based on the conditions mentioned above. For example, the DSO calculation at a monthly level may utilizes the Equation (1):

$$DSO = \left( \frac{\text{Average Open Receivables Balance of Previous } X \text{ Months}}{\text{Average Monthly Revenue of Previous } X \text{ Months}} \right) * \quad (1)$$

(Number of Days in the Month)

where X is any positive number.

In view of the forgoing, the described system provides for a reliable and accurately predicted future DSO forecast. In some implementations, the described system may be employed to predict the future DSO forecast for N future time periods. Provided open receivables and revenue information is available, the DSO forecasting system can be applied to any datum where the DSO KPI is calculated for an organization. The described DSO forecasting system can be applied to an organization constituting several internal organizations or a single organizational body. Furthermore, the system can be applied at multiple granularity levels, such as monthly, quarterly, yearly, and so forth. These factors provide flexibility and enables DSO trends to be forecast at differing levels of granularity as well as for an entire organization or its individual organizational entities.

FIG. 1 depicts an example environment 100 that can be employed to execute implementations of the present disclosure. The example system 100 includes computing devices 102, 104, 106, 108, a back-end system 130, and a network 110. In some implementations, the network 110 includes a local area network (LAN), wide area network (WAN), the Internet, or a combination thereof, and connects web sites, devices (e.g., the computing devices 102, 104, 106, 108) and back-end systems (e.g., the back-end system 130). In some implementations, the network 110 can be accessed over a wired and/or a wireless communications link. For example, mobile computing devices (e.g., the smartphone device 102 and the tablet device 106), can use a cellular network to access the network 110. In some examples, the users 122-126 may be working as agents for one of the participating organizations.

In the depicted example, the back-end system 130 includes at least one server system 132 and a data store 134. In some implementations, the at least one server system 132 hosts one or more computer-implemented services employed within the described DSO forecasting system, such as the modules described within architecture 200 (see FIG. 2), that users 122-126 can interact with using the respective computing devices 102-106. For example, the computing devices 102-106 may be used by respective users 122-126 to generate multi-step DSO forecasting through services hosted by the back-end system 130. In some implementations, the back-end system 130 provides an application programming interface (API) services with which the server computing device 108 may communicate.

In some implementations, back-end system 130 may include server-class hardware type devices. In some implementations, back-end system 130 includes computer systems using clustered computers and components to act as a single pool of seamless resources when accessed through the network 110. For example, such implementations may be used in data center, cloud computing, storage area network (SAN), and network attached storage (NAS) applications. In some implementations, back-end system 130 is deployed using a virtual machine(s).

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is a smartphone, the computing device 104 is a desktop computing device, and the computing device 106 is a tablet-computing device. The server computing device 108 may include any appropriate type of computing device, such as described above for computing devices 102-106 as well as computing devices with server-class hardware. In some implementations, the server computing device 108 may include computer systems using clustered computers and components to act as a single pool of seamless resources. It is contemplated, however, that implementations of the present disclosure can be realized with any of the appropriate computing devices, such as those mentioned previously.

Figure 2:
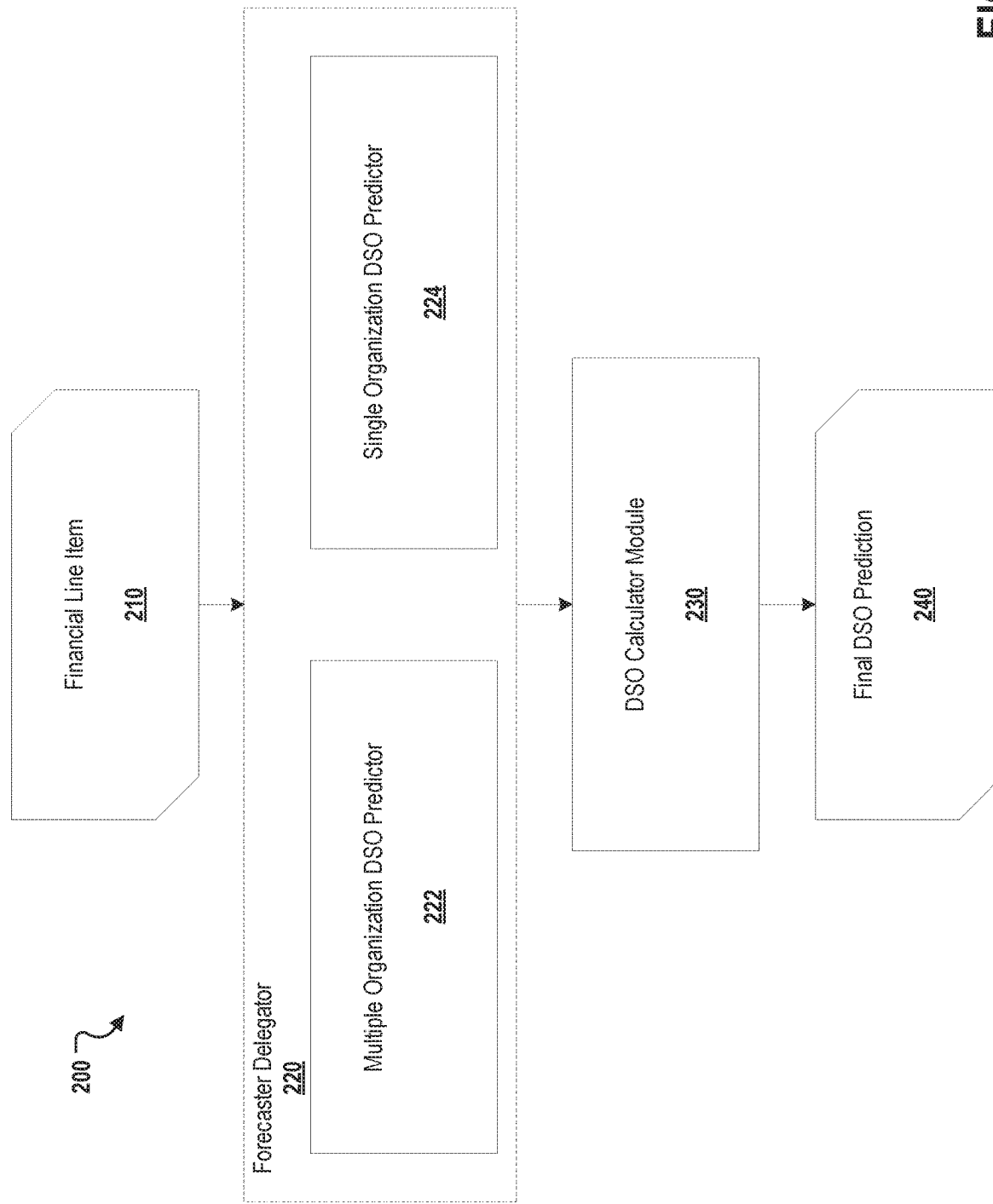
FIG. 2 depicts an architecture that may be employed within the described DSO forecasting system.

FIG. 2 depicts an example architecture 200 that may be employed within the described DSO forecasting system. As depicted, the architecture 200 includes financial line item data 210, DSO forecaster delegator module 220, DSO calculator module 230, and final prediction 240. As depicted in FIG. 2, the DSO forecaster delegator module 220 includes two modules: multiple organization DSO predictor engine 222 and single organization DSO predictor engine 224, which allow multi-step DSO forecasting to be performed at a single organization level, or an organization consisting of multiple organization entities. Such consideration is due to the fact that some companies may have one or few organization to deal with, whereas other companies may have large number of organizations. An organization that includes multiple internal organizations can elect to utilize the single organization engine 224 for calculating the DSO forecast. This could occur when, for example, the internal organizations of a multiple organization includes insufficient records to employ the multiple organization engine 222.

In some implementations, a forecast delegator assigns financial line item data 210 to the appropriate predictor engine (e.g., either engine 222 or 224). Each predictor module executes a set of machine learning algorithms to produce internal open receivable and revenue forecast predictions. The DSO calculator module 230 combines the internally produced open receivable and revenue forecast predictions to produce the final DSO prediction 240. The example architecture 200 is described in greater detail below with regard to FIGS. 3 and 9.

Figure 3:
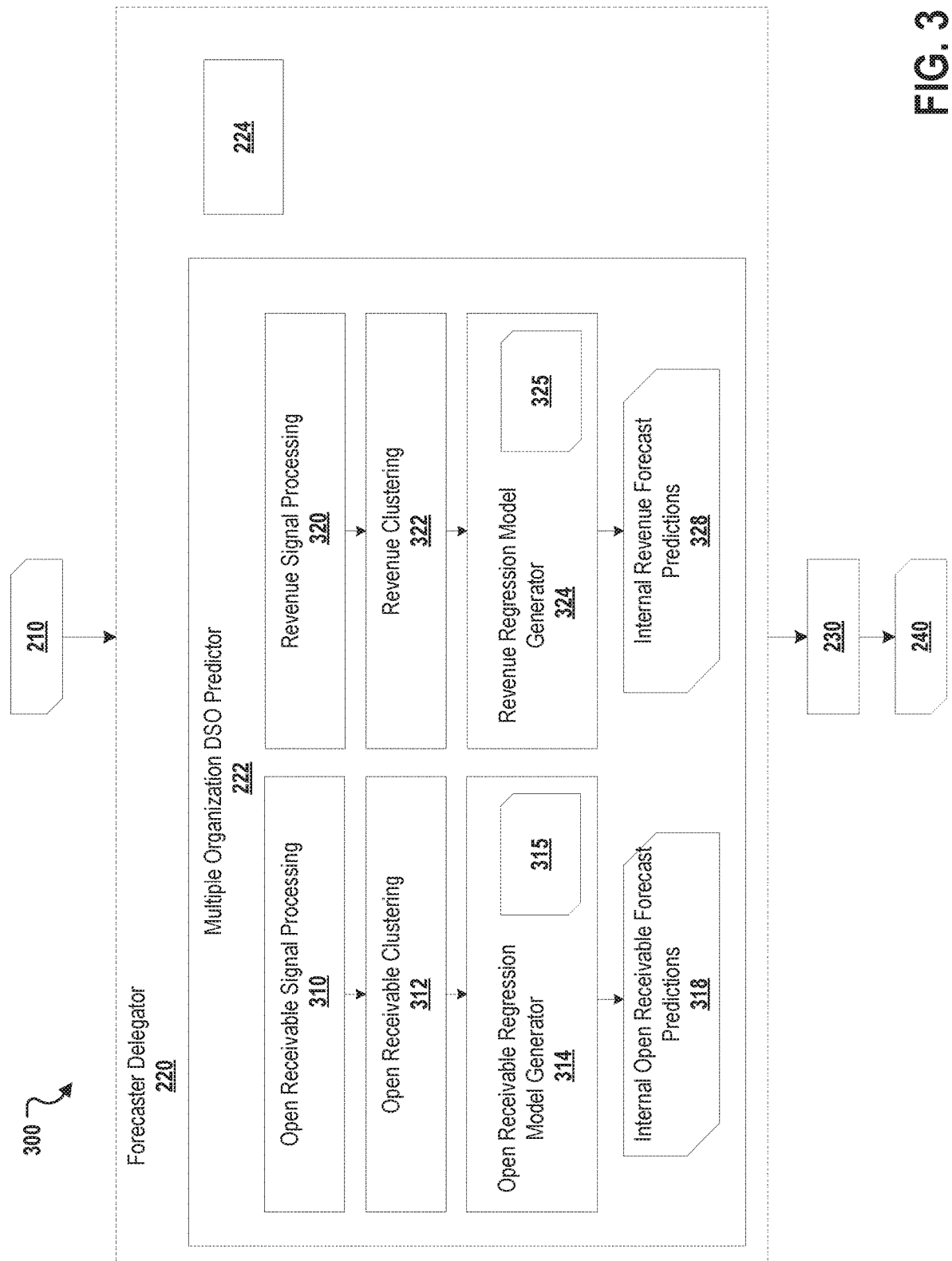
FIG. 3 depicts an example architecture of a multiple organization DSO predictor module.

FIG. 3 depicts an example architecture 300 of the multiple organization DSO predictor engine 222. As depicted in FIG. 3, the multiple organization DSO predictor engine 222 includes open receivable signal processing module 310, open receivable clustering module 312, open receivable regression model generator module 314, revenue signal processing module 320, revenue clustering module 322, and revenue regression model generator module 324.

In the depicted example architecture 300, signal processing of the open receivable is performed by the open receivable signal processing module 310 and signal processing of the revenue is performed by the revenue signal processing module 320. In some implementations, the input into the open receivable signal processing module 310 is a set of original time series from multiple organizations. In such implementations, each of the time series records may indicate that the open receivable of an organization occurred in the past n time points. In some implementations, the input into the revenue signal processing module 320 is a set of original time series from multiple organizations. In such implementations, each of the time series records may indicate that the revenue of one organization occurred in the past n time points. Such time series form the original data space which could be high dimensional when the number of past time series is large. Moreover, the original time series may not be available directly. However, such time series information can be extracted by processing the financial line item data 210. The financial line item data may be the original financial documents (e.g. invoices) collected from different organizations. With signal processing, both of the module 310 and the module 320 transform the time series from original data space into lower-dimensional space, where the original time series with similar underlying features are projected closely in the new data space. With the signal process technique, the noise can be decorrelated from the original time series and the underlying features can be preserved with the new representation but more obviously. With the projected time series, better separation and distinguishing of clusters may be achieved.

In some implementations, the open receivable signal processing module 310 performs projection methods, such as Principal Component Analysis (PAC) and/or Independent Component Analysis (ICA) to transform the time series from an original data space into new lower dimensional representation. As output, the original time series is projected into a lower dimensional space, where the original time series with similar underlying feature is projected more closely in the new projection space. With the support of signal processing, anomalous, unexpected or uncommon change in the original time series may be removed, but the common underlying features can be preserved and become more obvious. With the more obvious underlying features represented in lower dimensional space, the clustering algorithm is able to identify groups of time series having similar underlying features more easily. For example, time series with a go-up trend may be grouped into one cluster where time series with periodical features may be grouped into another. It is to note that the signal processed time series, as output of module 310 and module 320, may be used in by the open receivable clustering module 312 and the revenue clustering module 322. However, to facilitate the prediction of open receivable and revenue in future time points, the original time series may be used in regression model as input. This means both original time series and the signal processed time series in lower dimensions may be employed in the whole solution.

Clustering is performed by the open receivable clustering module 312 and the revenue clustering module 322 to group the open receivable/revenue time series into clusters where the time series assigned to the same cluster are identified as having similar features. For clustering, a density-based algorithm, such as Gaussian Mixture Model, may be employed. As the output the clusters are identified and each original open receivable/revenue time series is associated with one cluster candidate that it is most similar with it.

The clusters are received by the open receivable regression model generator module 314 and the revenue regression model generator module 324 respectively from the open receivable clustering module 312 and the revenue clustering module 322. For each identified time series cluster, the multi-step time series forecasting is fulfilled by building open receivable regression models 315 and revenue regression models 325 in the open receivable regression model generator module 314 and the revenue regression model generator module 324 respectively. Finally, the internal open receivable forecast predictions 318 and the internal revenue forecast predictions 328 are passed as output and fed to the DSO calculator component.

With the above architecture 300, new financial line items with the same features can be assigned to one cluster, where future open receivable and revenue forecast predictions can be produced for the required number of future time points. The predicted DSO can be calculated with the predicted open receivables and predicted revenue.

FIGS. 4A-8 and 9-13B depicts flow diagrams of example processes. For clarity of presentation, the description that follows generally describes these processes in the context of FIGS. 1-14. However, it will be understood that these processes may each be performed, for example, by any other suitable system, environment, software, and hardware, or a combination of systems, environments, software, and hardware as appropriate. In some implementations, various operations of these processes can be run in parallel, in combination, in loops, or in any order.

Figure 4A:
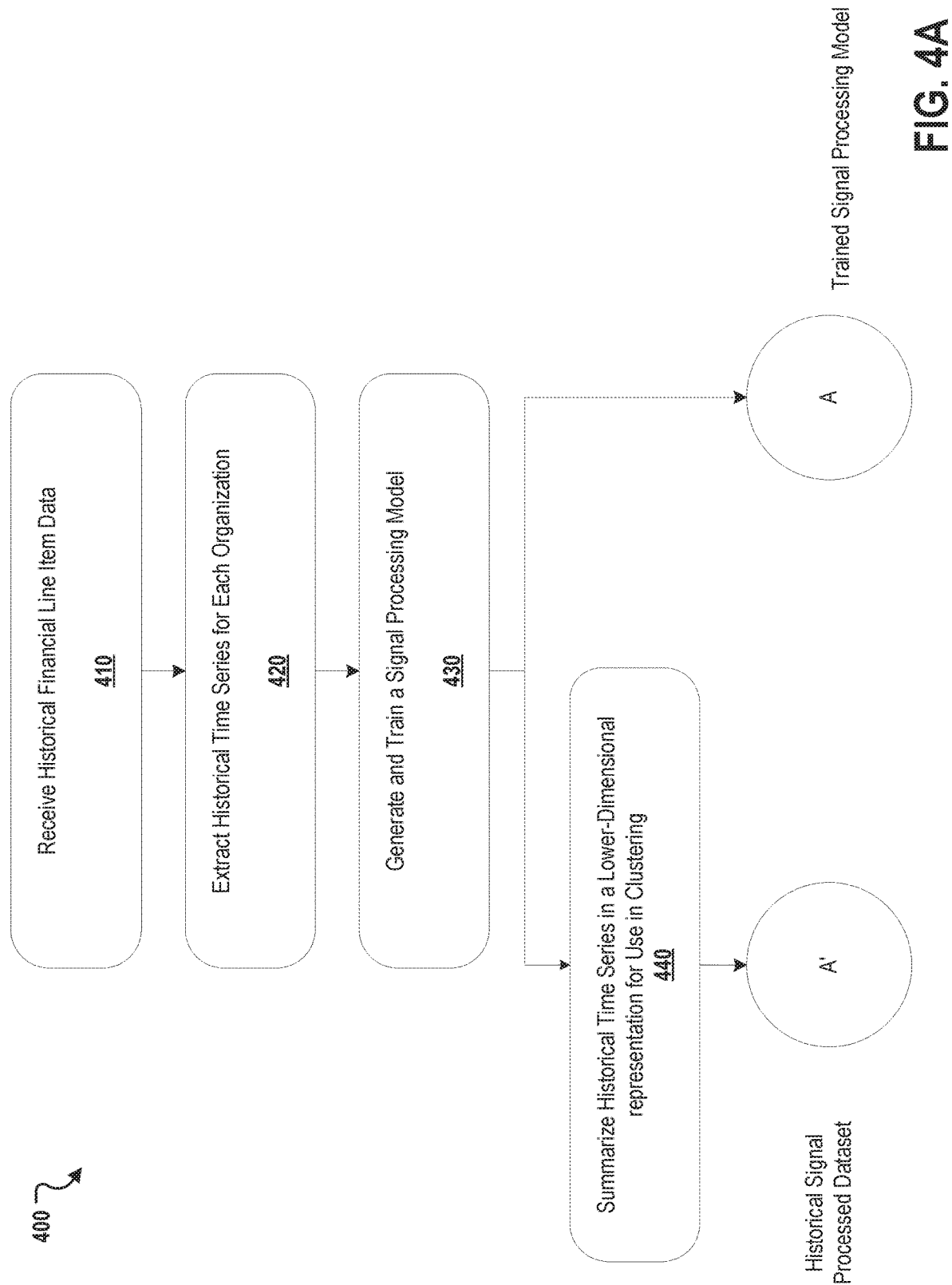

FIGS. 4A and 4B depicts flow diagrams of example processes 400 and 450 respectively. In some implementations, the example processes 400 and 450 may be performed by the open receivable signal processing module 310 or the revenue signal processing module 320. As depicted in FIG. 4A, process 400 may be employed for building a signal processing model to produce a new representation of the original time series with lower dimensions and the transformed time series act as an input dataset for clustering. Historical time series (of either the open receivables or the revenue) for each organization is extracted 420 from historical financial line item data. In some implementations, for an organization containing a long-extracted time series of historical information, the time series can be 'cut' into segments (e.g., of equal length) with a differing offset. In some implementations, the long-extracted time series provides that the number of available time points in time series is equal or larger than the sum of the number of required past time points and the number of future time points. In such an example case, segments can be used. For instance, when $N_{future}$ future time points are to be predicted based on the $N_{past}$ past time points, one time series segment will consist of $N_{future}+N_{past}$ time points. Then, given the long original time series, the first segment is extracted by cutting from first time point to the $(N_{future}+N_{past})^{th}$ time point of the long time series and the second segment is extracted by cutting from second time point to the $(N_{future}+N_{past}+1)^{th}$ time point, until the last time point of the long time series is reached. As the output, a set of segments may be extracted from one long time series, but they are from the same organization. A signal processing model is generated and trained 430 with the historical time series or the extracted time series segments. The trained model, represented as output A, can be applied to a time series extracted from new financial line item data (See FIGS. 4B and 8). The signal processing model can be employed to summarize 440 the historical time series (of either open receivables or revenue) in a lower-dimensional representation for use in clustering (See FIG. 5A), represented as output A' the historical signal processed dataset.

As depicted in FIG. 4B, process 450 may be employed to produce a processed data set that includes a subset of features from either an open receivables feature set or a revenue feature set to act as an input dataset for clustering. New financial line item data is received 460. The new data may include open receivables data or revenue data. A full set of time series records is extracted 470 from the new financial line item data. In some implementations, each of the full set of time series records has the same segment length as the time series of the historical time series information extracted at step 420 of process 400 (FIG. 4A). A signal processing model trained using, for example, a historical time series (e.g., the output of process 400 from FIG. 4A) is applied 480 to the extracted full set of new time series records. By applying the trained model, the extracted full set of time series (segment) records can be summarized in a lower-dimensional representation for use in clustering as a signal processed data set, represented as output B.

Figure 5B:
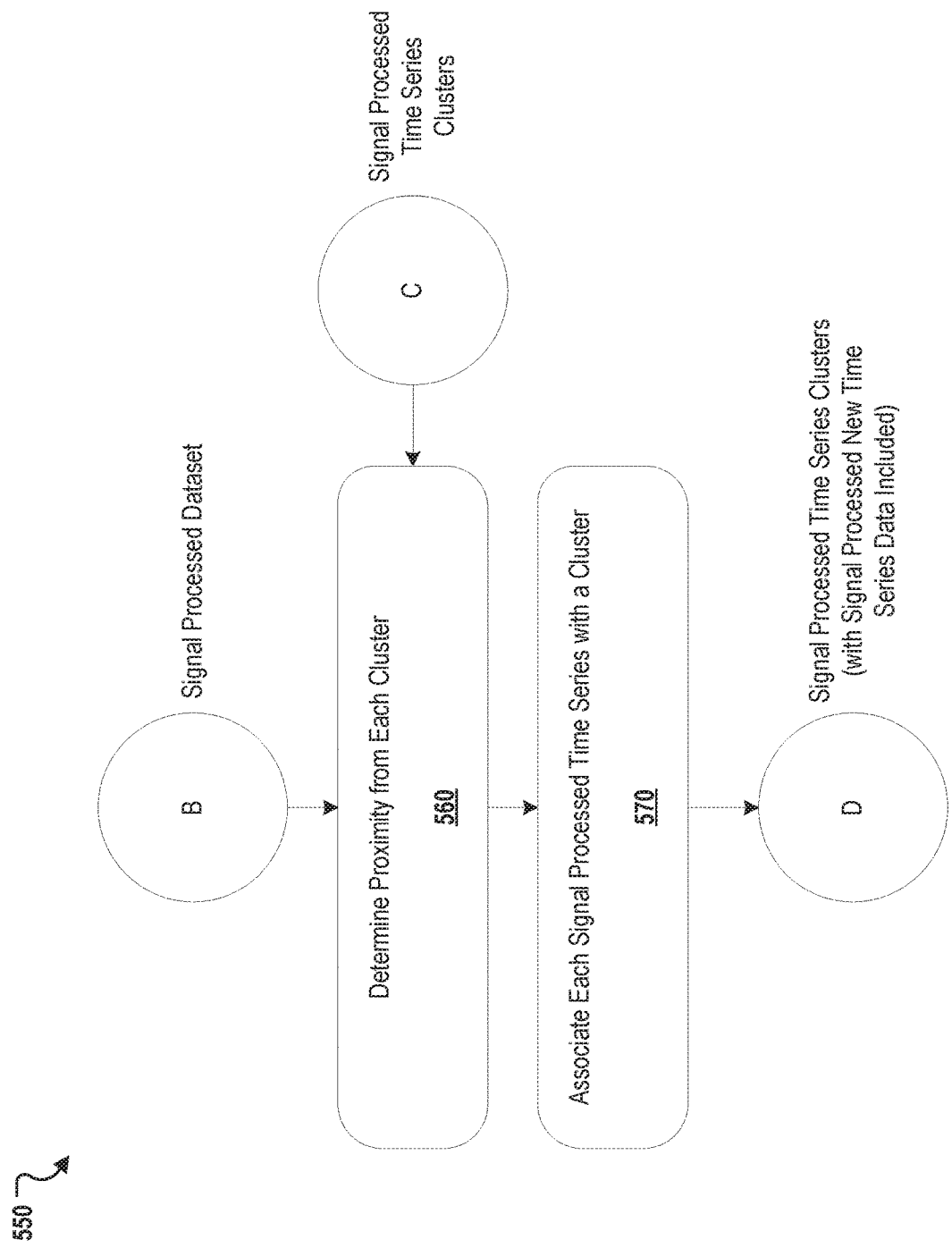

FIGS. 5A and 5B depicts flow diagrams of example process 500 and 550 respectively. The example processes 500 and 550 may be performed by the open receivable clustering module 312 or the revenue clustering module 322. In some implementations, clustering algorithms are performed by either clustering module (312 or 322) to group the transformed time series data into clusters. In some examples, with clustering, the aim is to identify groups of open receivable/revenue time series, where the transformed time series within a same group are similar to each other.

As depicted in FIG. 5A, process 500 may be employed for grouping different signal processed financial line item data into clusters. A clustering method is performed 510 on the historical signal processed dataset, output A' from process 400 of FIG. 4A, to determine non-overlapping clusters and preserve the cluster centroids. Each signal processed time series (e.g., the lower-dimensional representation) from the historical signal processed dataset (A') is associated 520 with a signal processed time series cluster. The signal processed time series clusters, are represented as output C.

As depicted in FIG. 5B, process 550 may be employed to assign a new signal processed time series to a relevant cluster. Based on the trained clustering model, new signal processed time series—output from the applied signal processing model (FIG. 4B)—can be accepted with the same data structure and can be assigned to the optimal cluster. For each output new signal processed time series, distances between the new signal processed time series and the cluster centroids of the open receivable signal process time series clusters (e.g., determined according to the clustering method of process 500) are calculated 560. For example, the cluster with the smallest distance may be selected as the one where the new signal processed time series is assigned. Based on the determined distances, each of the new signal processed open receivable time series is assigned 570 to the optimal cluster with the most similar feature(s). The signal process time series clusters with the signal processed new time series data included, represented as output D, may be re-calibrated dynamically in process 600 of FIG. 6.

Figure 6:
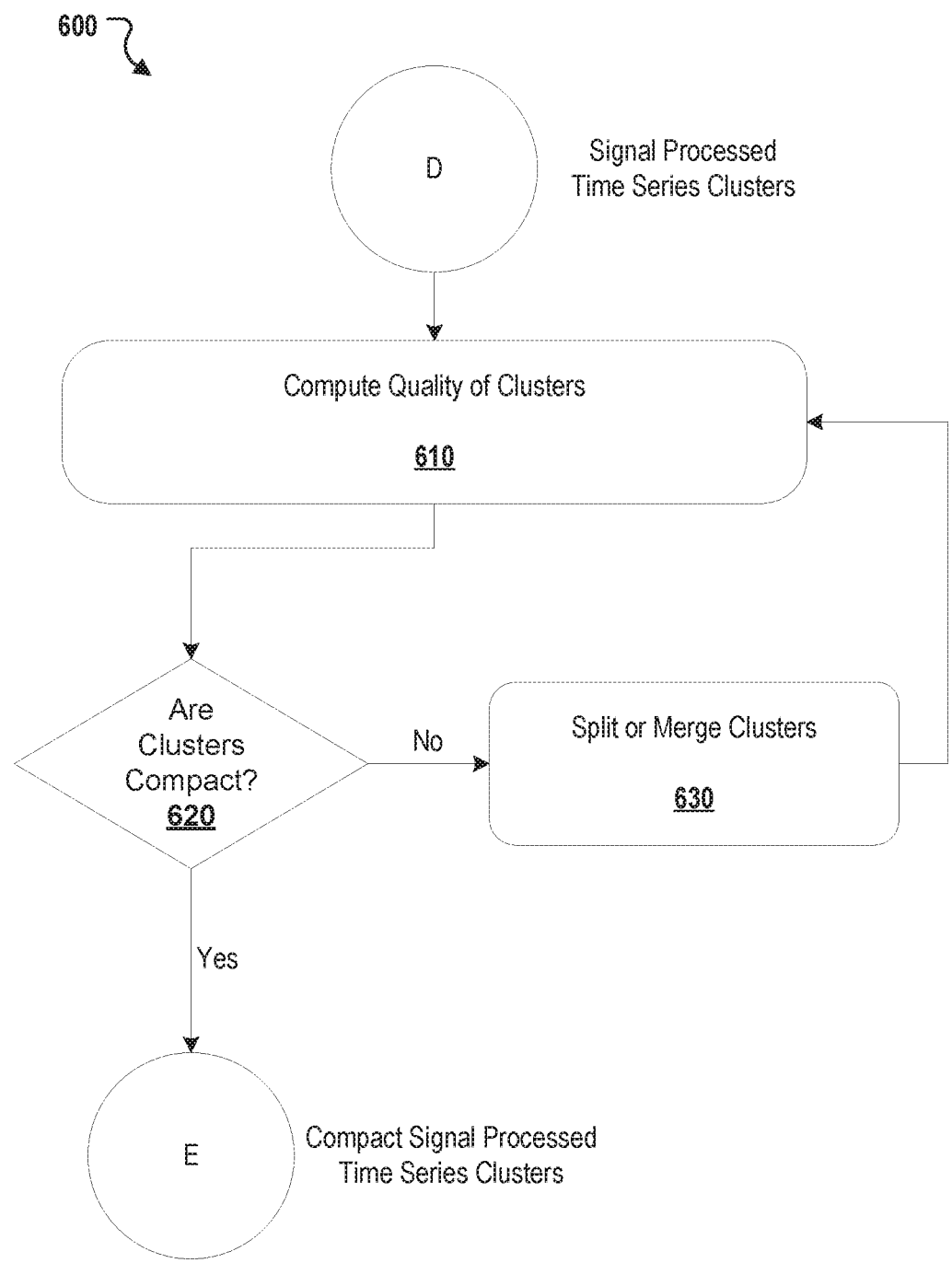
FIG. 6 depicts a flow diagrams of an example process to re-calibrating clusters dynamically.

FIG. 6 depicts a flow diagrams of an example process 600 to dynamically re-calibrating clusters, such as the output D of process 550. The example process 600 may be performed by the open receivable clustering module 312 or the revenue clustering module 322. With new signal processed time series being assigned to clusters, an underlying process 600 is designed to dynamically re-calibrate the existing clusters. Although open receivable signal processed time series clusters may be essentially obtained by performing clustering methods periodically (See FIGS. 5A-5B), the underlying optimizing process 600 should be considered. One reason behind this is that during one lifecycle of a clustering model, many new signal processed time series could be created for business operation. When these new signal processed time series are assigned to existing clusters, it is possible that, for example, two clusters that were originally separated become identical. In such examples, the two identical clusters can be merged into one cluster. As another example, an existing clusters may be split into smaller clusters as new signal processed time series are added to form new smaller clusters.

As shown in FIG. 6, the cluster splitting/merging algorithms can be applied in the re-calibrating process. The quality of the signal processed time series clusters is calculated 610. In some implementations, a validity index is calculated and employed to evaluate changes to the existing clusters. When the clusters are determined to be compact (e.g., based on a comparison of the calculated validity index compared to a threshold value(s), the compact clusters, represent as output E, are returned. When the clusters are determine 620 to not be compact (e.g., the quality of clustering can be improved) the clusters are split or merged 630 accordingly. For example, based on the comparison of a respective validity index with the threshold values(s) clusters can be split or merged accordingly. However, it is worth pointing out that when there is an improvement made on the existing clusters, the regression parts should be re-trained.

Figure 7:
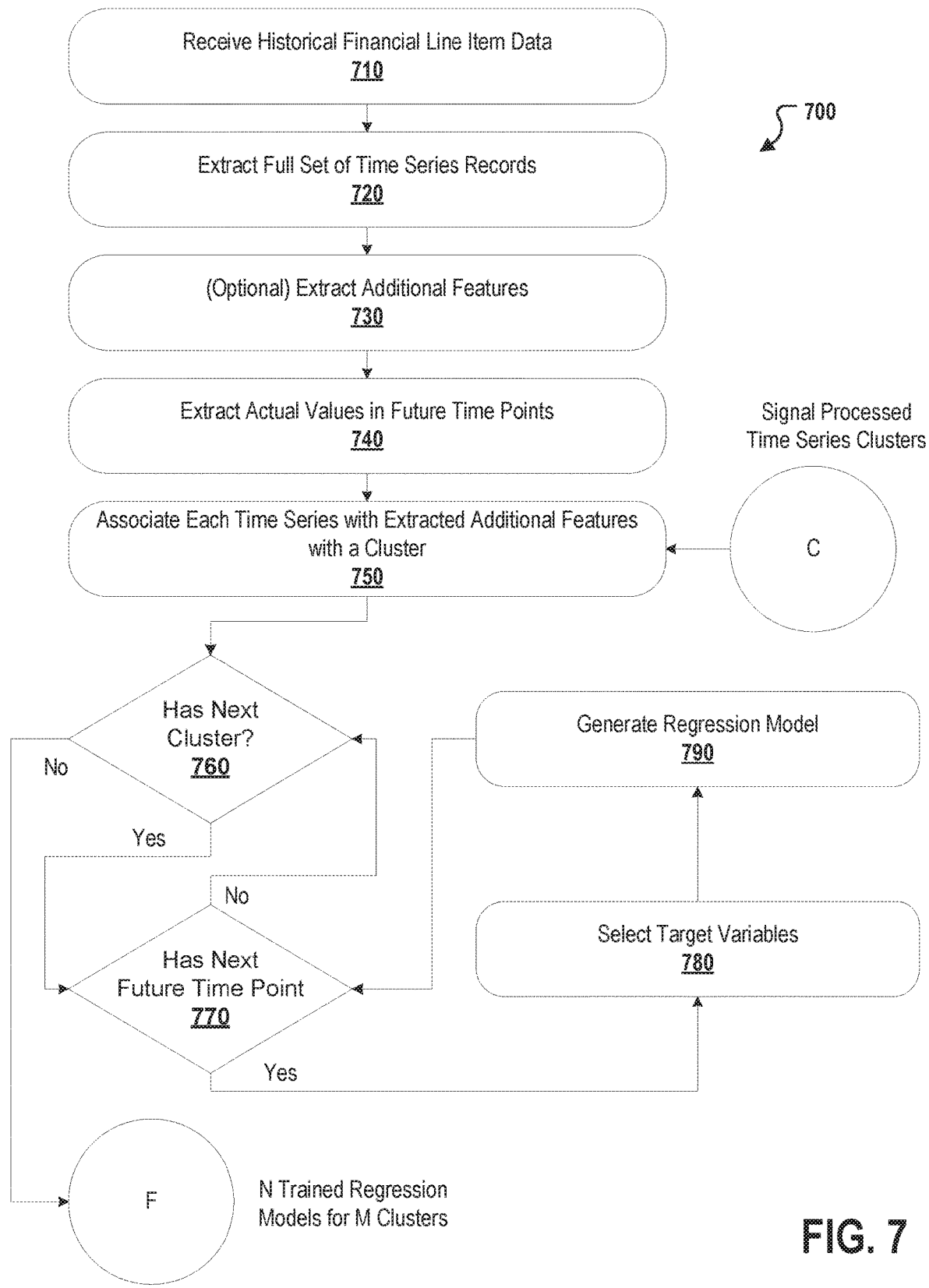
FIG. 7 depicts a flow diagrams of an example process to generate open receivable multi-step time series forecasting regression models, such as the open receivable regression model.

FIG. 7 depicts a flow diagrams of an example process 700 to generate multi-step time series forecasting regression models, such as the open receivable regression models 315 or the revenue regression models 325 of FIG. 3. The example process 700 may be performed by the open receivable regression model generator module 314 or the revenue regression model generator module 324 of FIG. 3. As shown in FIG. 7, regression models are used within the process 700 to fulfil the multi-step time series forecasting of open receivables or revenue.

In some implementations, regression algorithms are used to fulfil multi-step time series forecasting for open receivables or revenue. Historical financial line item data is received 710. The historical data may include open receivables data when processed by the open receivable regression model generator module 314 or revenue data when processed by the revenue regression model generator module 324. A full set of time series records are extracted 720 from the historical financial line item data. In some implementations, these records have the same length, including past time points and future time points. Additional feature may be optionally extracted 730 from the historical financial line item data. The past time points of the time series with the optional additional information are used as input variables and the actual values in future time points of the time series are extracted 740 as target variables to train a regression model, such as the open receivable regression models 315 or revenue regression models 325 of FIG. 3. It is worth noting that multiple future time points may be predicted. In this case, multiple regression models may be trained, where each regression model is trained to predict one future time point. This means all the regression models share the same input variable but are with different target future time point. To improve accuracy, and make these models more robust, the output, output C, from either clustering module (312 or 322 depending of the type of data being processed) is considered. At 750, each time series (with optional additional input features) is assigned to the cluster of the signal processed time series it is related to.

For each future time point 770 in each identified cluster 760, a regression model is trained based on the set of original time series from the same cluster as shown in steps 780 and 790. Target variables corresponding to the currently selected future time point are selected 780 where the actual values are used as target values. For the training data, the time series may include the values in past time points, used as input data, with future values of the time series representing target values. Furthermore, when extra information is available, the information can be included as additional input features. Within each cluster, for each future time point to predict, an individual regression model is generated 790 where the time series of past time points along with the additional attributes are used as input data and the actual values corresponding to current future time point are used as target. The same training process is repeated on all future time points iteratively.

The output, represented as output F, may include a set of forecasting regression models trained for each cluster. Thus, when there are M future time points to predict, there will be M regression models built with the same input variables, but with different target variables. The output includes historical time series with similar features that are extracted into individual clusters. Thus, if N clusters exist and there are M future time points to predicted, as M regression models can be built with the same input variables, but differing target variables, for each of the N clusters, where there will be totally M*N regression models to train.

Figure 8:
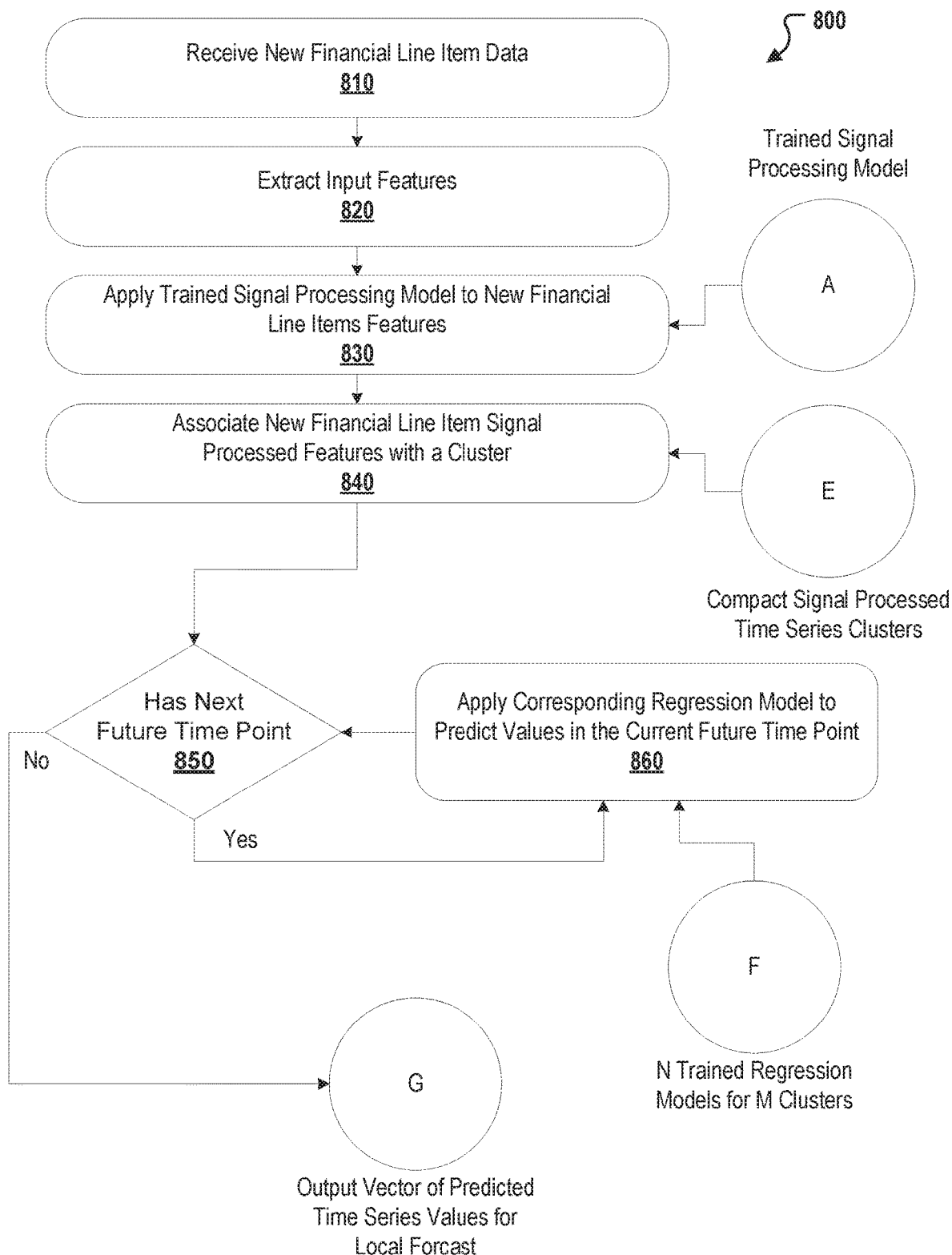
FIG. 8 depicts a flow diagrams of an example process to apply open receivable multi-step time series forecasting regression models, such as the open receivable regression model.

FIG. 8 depicts a flow diagrams of an example process 800 to apply multi-step time series forecasting regression models, such as the open receivable regression models 315 or the revenue regression models 325 of FIG. 3. The example process 800 may be performed by the open receivable regression model generator module 314 or the revenue regression module generator 324 of FIG. 3. In some implementations, when applying the forecasting branch on new financial line data, the time series is extracted, the time series signal processing model applied, with the output signal processed time series used to assign the time series to the appropriate cluster, and finally the trained regression models are applied.

New financial line item data is received 810. The new data may include open receivables data when processed by the open receivable regression model generator module 314 or revenue data when processed by the revenue regression model generator module 324. The input features with the same structure as defined in the training stage are extracted 820. The new financial line item time series features are signal processed 830 by applying the trained signal processing model, output A from process 400. The signal processed time series and optional additional features are associated 840 with a cluster based on the compact signal processed time series clusters, output E, of process 600 (output D of process 550 may alternatively be used when the cluster are not recalibrated through process 600).

For each future time point 850, a prediction process 860 may be performed iteratively. The prediction process 860 includes applying a regression model to each future time point predict values in the current future time point. Given the current future time point, the forecasting regression model is applied to predict the time series value for the current future time point. The output, represented as output G, of the multi-step time series forecasting regression may include vector of internal forecast prediction values (for either open receivables or revenue) of all future time points.

Figure 9:
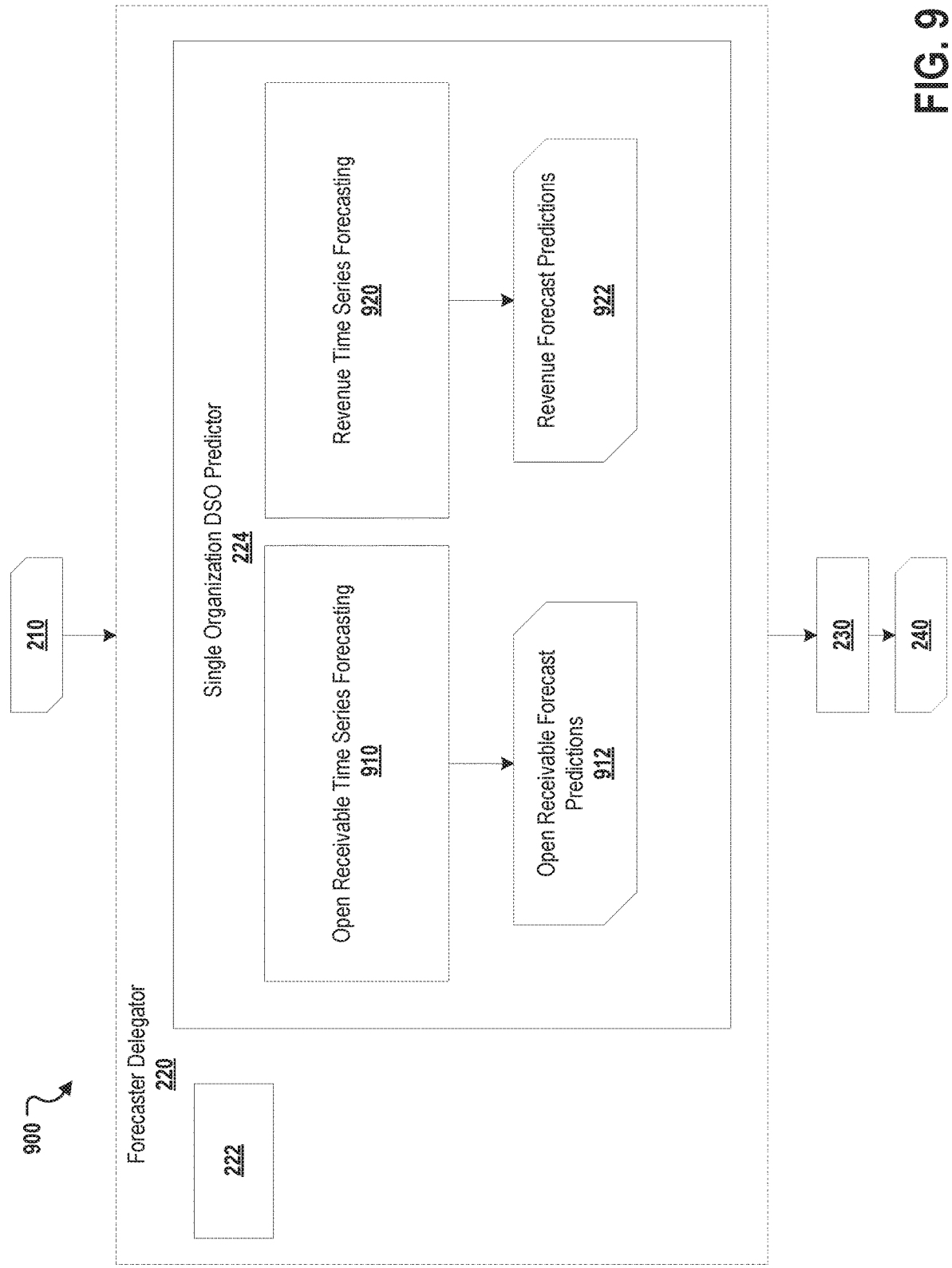
FIG. 9 depicts an example architecture of the single organization DSO predictor.

FIG. 9 depicts an example architecture 900 of the single organization DSO predictor engine 224 (See FIG. 2). As depicted in FIG. 9, the single organization DSO predictor engine 224 includes open receivable time series forecasting module 910, and revenue time series forecasting module 920. For each module, the production of internal multi-step open receivable and revenue forecast predictions may be fulfilled through time series algorithms performed on each time series of financial line item data existing for the organization (See FIG. 10). This means when there are N time series in the dataset, there will be N time series models built, each predicting the time series values of the next M future time points individually. As an output, the internal multi-step open receivable predictions 912 and revenue forecast predictions 922 are passed as output and fed to the DSO calculator component. With the above design, new financial line items representing a single organization, can have future open receivable and revenue forecast predictions produced for the required number of future time points.

Figure 10:
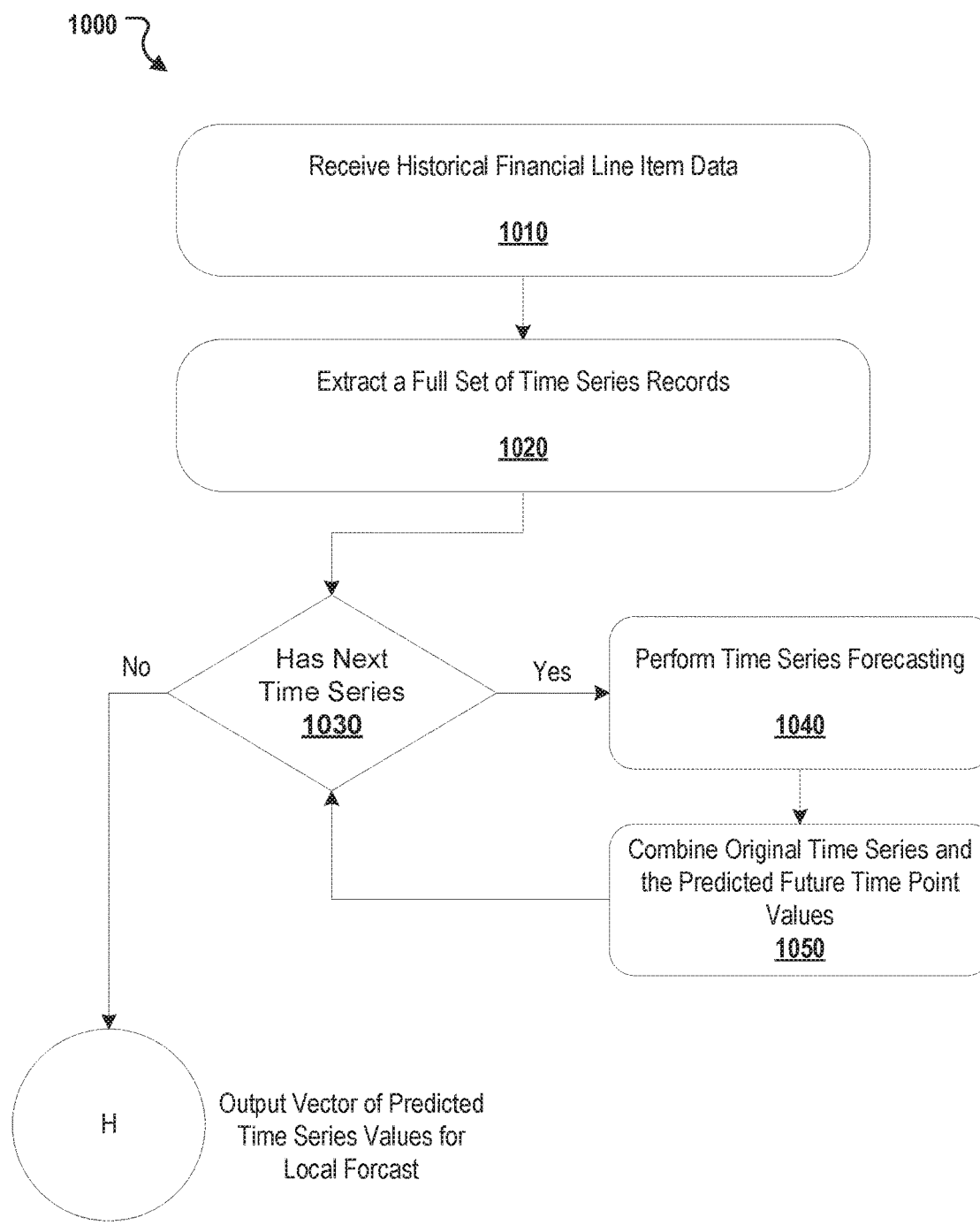
FIG. 10 depicts a flow diagrams of an example process to generate multi-step forecasting through a time series algorithm for financial line item data.

FIG. 10 depicts a flow diagrams of an example process 1000 to generate multi-step forecasting for open receivable or revenue through a time series algorithm for financial line item data. The example process 1000 may be performed by the open receivable time series forecasting module 910 or the revenue time series forecasting module 920. As shown in FIG. 10, when producing either the open receivables or revenue forecast, the time series algorithm is repeatedly performed on each time series in the dataset. Historical line item data is received 1010. The historical data may include open receivables data when processed by the open receivable time series forecasting module 910 or revenue data when processed by the revenue time series forecasting module 920. A full set of time series records is extracted 1020. In some implementations, the records are with the same length in the past time points. For each time series, steps 1040 and 1050 are performed 1030. A time series forecasting is performed 1040 on the time series to predict time series values of future time points. The time series and the predicted future time point values are combined 1050. As output, represented as output H, predictions of either the open receivable or revenue values at future time points are obtained depending on which of the modules (910 or 920) is processing the data and the type of data the is being processed. It is worth noting that when performing the time series algorithm on the M time series in the dataset, M time series models are built. The output of the multi-step time series forecasting is represented by a vector of predicted values of all future time points, and is regarded as an internal open receivable forecast prediction or a revenue receivable forecast prediction.

Figure 11:
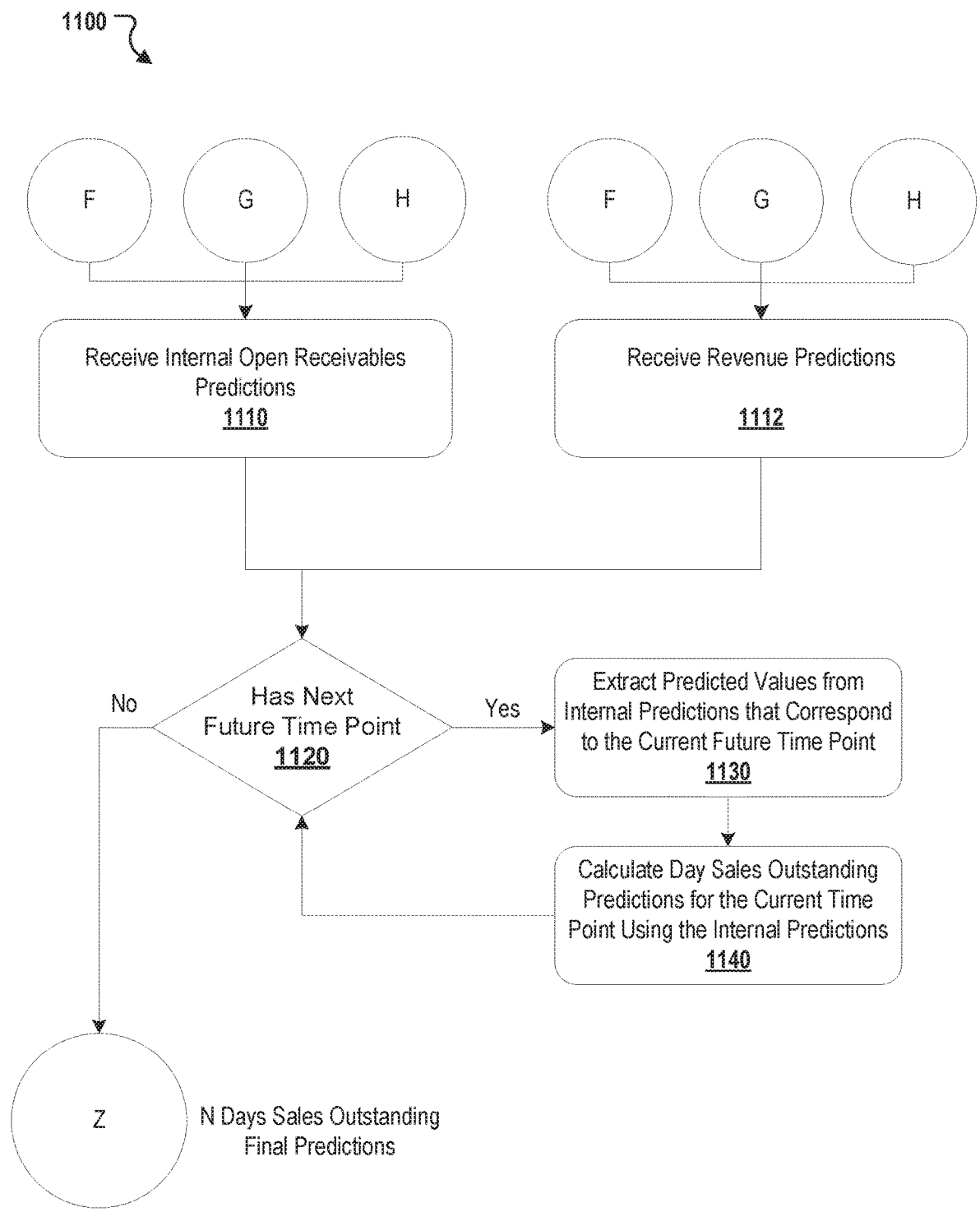
FIG. 11 depicts a flow diagrams of an example process to iteratively calculate direct day sales based on internal predictions, with each forecast time point corresponding to one future time point.
Figure 12A:
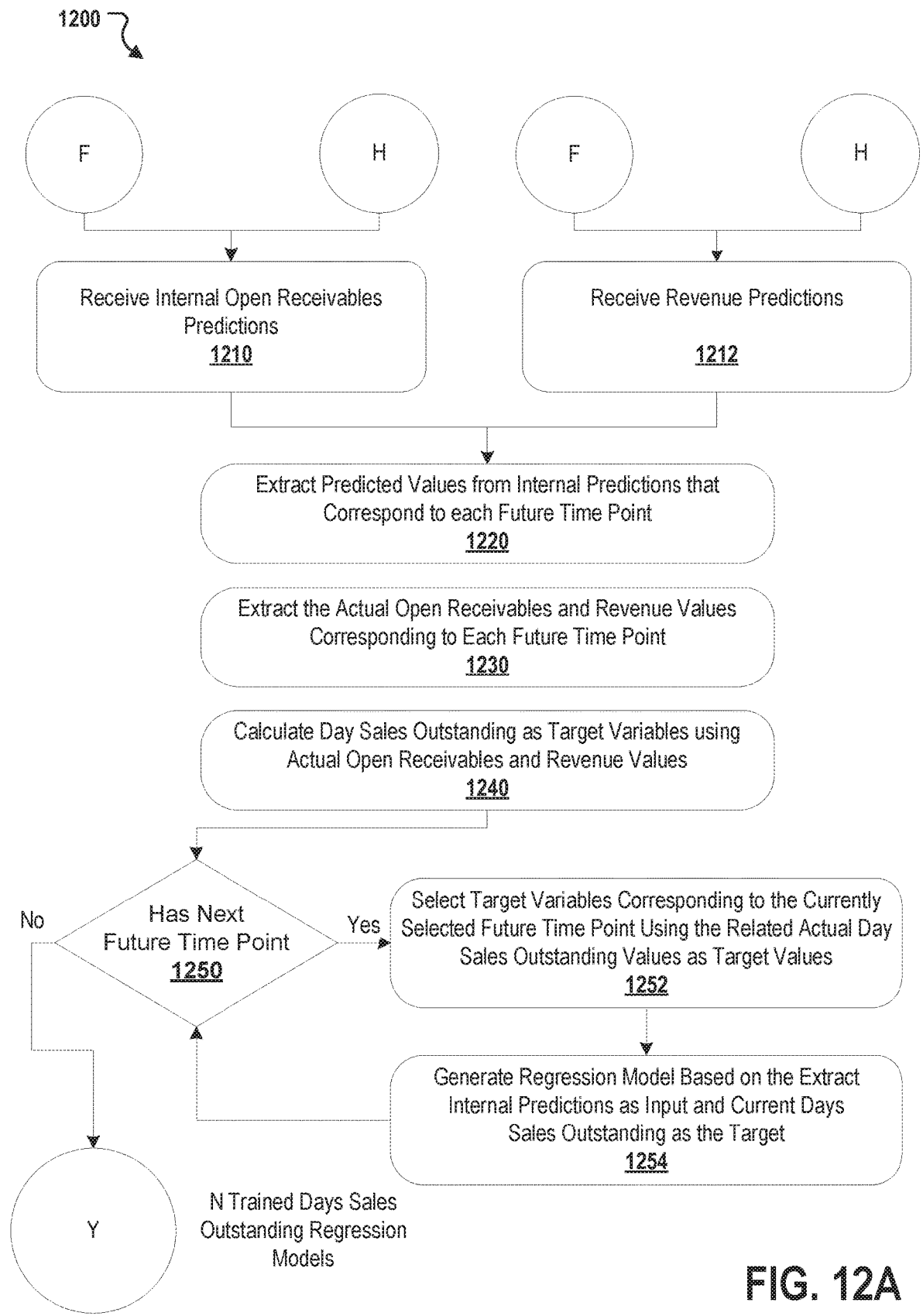
FIG. 12A depicts a flow diagrams of an example process to train DSO multi-step regression to predict days sales outstanding forecast.
Figure 12B:
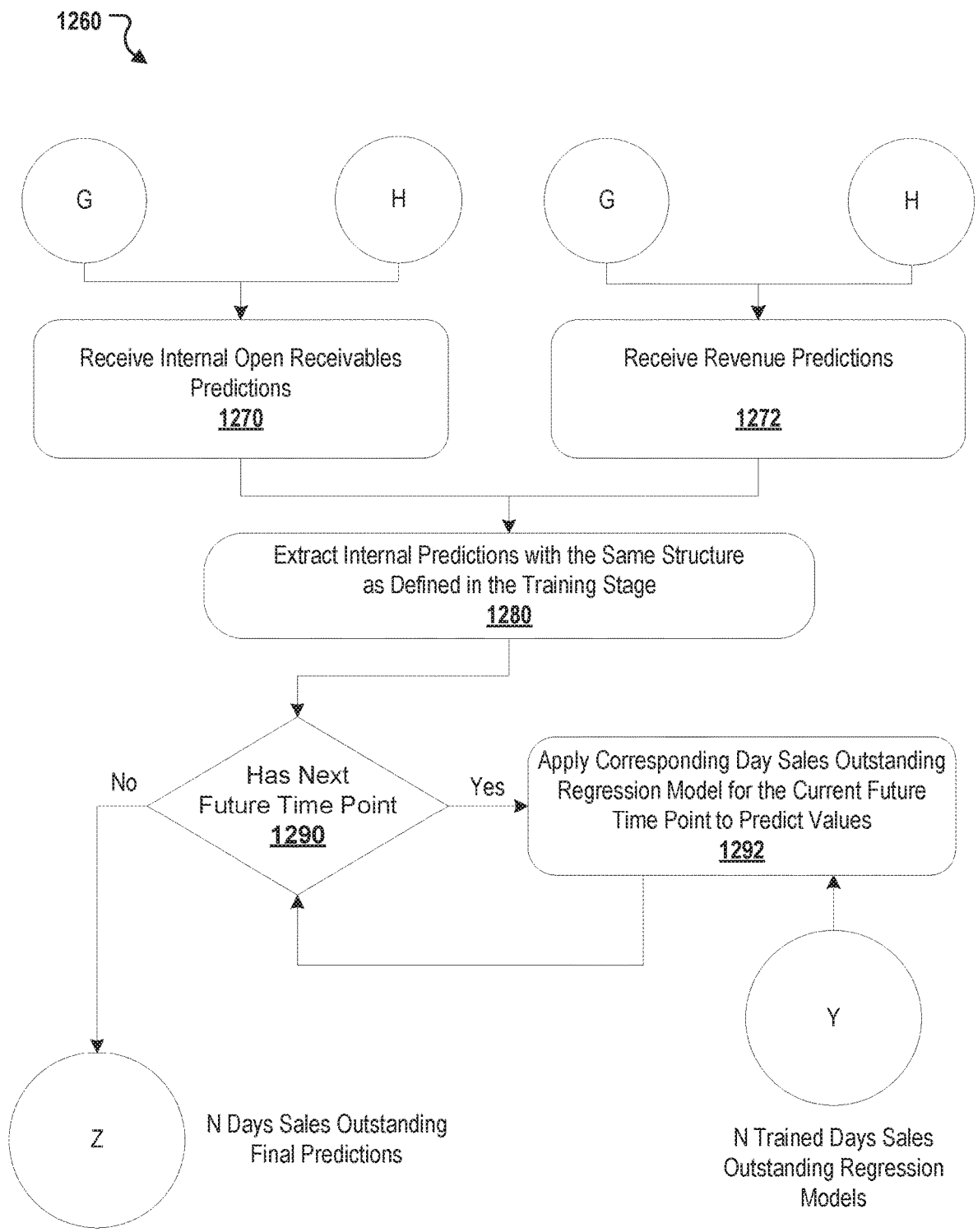
FIG. 12B depicts a flow diagrams of an example process to apply DSO multi-step forecast regression models predicting final days sales outstanding forecast.

FIGS. 11, 12A, and 12B depicts processes to combine internal open receivable and revenue forecasts. In some implementations, when either of the forecasting branches are performed, a vector of internal open receivable predictions and a vector of revenue predictions is obtained, each element of which corresponds to one future time point. In such implementations, the final prediction may be determined through utilization of these internal predictions. In some implementations, the DSO calculator module 230 from FIG. 2 is employed to combine the internal predictions to determine the final multi-step DSO forecast prediction. The DSO calculator module 230 may perform such a combination regardless of the utilized branch or, the underlying algorithms utilized within the branches, to product the internal open receivable and revenue forecast predictions.

In some implementations, the outstanding calculator module 230 can produce the final DSO prediction through following one of two possible directions: 1) DSO calculation, utilizing the internal predictions, the final DSO prediction values are produced for each future time point (See FIG. 11) or 2) Building Multi-step DSO regression models, utilizing the local predictions as input variables, final DSO values are predicted for each future time point (See FIGS. 12A-12B).

FIG. 11 depicts a flow diagrams of an example process 1100 to iteratively calculate day sales outstanding based on internal predictions, with each forecast time point corresponding to one future time point. The example process 1100 may be performed by the DSO calculator module 230 of FIG. 2. The internal open receivable prediction are received 1110. For example, the outputs from processes 700, 800, and 1000 (F, G, and H respectively) when executed with open receivable financial line item data can be received at 1110. The internal revenue predictions are received 1112. For example, the outputs from processes 700, 800, and 1000 (F, G, and H respectively) when executed with revenue financial line item data can be received at 1112. For each next future time point 1120, steps 1130 and 1140 are executed. Predicted values are extracted 1130 from internal predictions that corresponds to the current future point. A DSO prediction for the current time point is calculated 1140 using internal predictions. In some implementations, the output, represented as output Z, of the process 1100 includes a vector of final DSO predictions for each future time point. Although the final DSO predictions can be calculated directly based on the predicted open receivable and predicted revenue in process 1100, in some cases, the final DSO prediction may be predicted by DSO regression models.

FIG. 12A depicts a flow diagrams of an example process 1200 to train DSO multi-step regression to predict days sales outstanding forecast. The example process 1200 may be performed by the DSO calculator module 230. As shown in FIG. 12A, regression models are used to fulfil the multi-step time forecasting of the final DSO predictions, with each forecast time point corresponding to one future time point. For training data, the internal open receivable and revenue predictions are used as input data. For target values, the actual DSO value is calculated for each future time point using the actual open receivable and revenue values. For each future time point a final prediction is to be produced for, an individual regression model is built where the internal open receivable and revenue predictions are used as input and the actual DSO values corresponding to current future time points are used as target. The same training process is repeated on the future time points iteratively.

Process 1200 differs from process 1100, as depicted in FIG. 11, in that DSO regression models are applied in process 1200. Thus, in some implementations, the process 1200 is more suitable when there are sufficient records of predicted open receivable and predicted revenue, but the internal prediction of open receivable and revenue are not stable or with acceptable accuracy. In such cases, the process 1200 can be employed to stabilize the predictions of the final DSO. The process 1200 may also be suitable when the rule of DSO calculation is changed frequently. In such cases, when only the actual DSO can be provided, the DSO regression model can be trained to approximate the DSO calculation rules The internal open receivable prediction are received 1210. For example, the outputs from processes 700 and 1000 (F and H respectively) when executed with open receivable financial line item data can be received at 1210. The internal revenue are received 1212. For example, the outputs from processes 700 and 1000 (F and H respectively) when executed with revenue financial line item data can be received at 1212. Predicted values are extracted 1220 from internal predictions corresponding to each future time point. The actual open receivable and revenue values are extracted 1230 corresponding to each future time points as target values in training data. DSO as target variables in training data are calculated 1240 using actual open receivable and revenue values. For each next future time point 1250, steps 1252 and 1254 are executed. Target variables corresponding to the currently selected future times point are selected 1252 using the related actual DSO values as target values. A regression model is generated 1254 based on extracted internal predictions as input and current DSO as the target. In some implementations, the output, represented as output Y, of the process 1200 includes a set of forecasting regression models trained for each future time point.

FIG. 12B depicts a flow diagrams of an example process 1260 to apply DSO multi-step forecast regression models predicting final days sales outstanding forecast. The example process 1260 may be performed by the DSO calculator module 230 of FIG. 2. When applying the DSO forecast regression models on new financial line item data, the new financial line item data may be first processed in the appropriate forecasting branch, where internal predictions are obtained, and then the trained DSO forecast regression models applied. As shown in FIG. 12B, the same prediction process may be performed iteratively on all future time points. Given the current future time point, the appropriate DSO regression model is applied to predict the DSO value for the current future time point.

The internal open receivable are received 1270. For example, the outputs from processes 800 and 1000 (G and H respectively) when executed with open receivable financial line item data can be received at 1270. The internal revenue predictions are received 1272. For example, the outputs from processes 800 and 1000 (G and H respectively) when executed with revenue financial line item data can be received at 1272. Internal predictions are extracted 1280 with the same structure as defined in the training stage. For each future time point 1290, step 1292 is executed. A corresponding DSP regression model is applied 1292 to predict values in the current future time point. As output, represented as output Z, the multi-step time series DSO forecast is fulfilled where a vector of final predicted day sales outstanding values of all future time points is produced.

Having only the internal predictions as input variables to either direction, the day sales outstanding calculation is decoupled from the original data the internal predictions were produced through. This enables the day sales outstanding calculation to successfully determine the quality of the predicted days sales outstanding forecast without any prior knowledge of the underlying data from which the internal open receivable and revenue predictions were produced.

The described DSO forecasting system can be applied in many applications. For example, with a use case objective to forecast monthly day sales outstanding for 3 future months, a dataset from a customer system is used to illustrate the performance of the described DSO forecasting system. In such an example, a dataset containing historical financial line items was collected. The customer system held information for 78 organizations, and contained approximately 315 million financial line items. The date range of these records covered August 2003 to March 2016. From this dataset, monthly open receivables and revenue data was aggregated for each organization over 51 monthly time points between July 2011 and October 2015. In the aggregation process, the set of financial line item records collected in one month for the same organization were retrieved, from which the sum value of revenue and open receivables was calculated. This process was repeated for all months forming two month based multi-step time series for each organization, one for open receivables, and one for revenue. The output was an open receivable dataset and revenue dataset. Though the forecasting is possible on any granularity of the data, the prediction was performed based on the monthly aggregated open receivable and revenue data. This was based on the requirement from the use case for the forecast predictions be at a month granularity.

Using 78 open receivable and 78 revenue aggregated time series, open receivable and revenue datasets were extracted. Although each extracted open receivable or revenue time series had 51 time points, it was requested to use only 7 past time points to predict the 3 future time points, where only 10 time points were used in training and the other 42 time points could be excluded. However, it was considered as the current 78 open receivable and 78 revenue records were insufficient in volume for training and testing the required models. Therefore, each individual time series in the open receivable dataset and revenue dataset may be segmented, meaning each time series could be divided into a sequence of segments with predetermined length. In the example case, 42 segments comprising 10 time points, representing 7 past time points and 3 future time points, were extracted from each open receivable or revenue time series. The output was open receivable and revenue datasets with an increased number of rows. The segmentation process is explained in detail below.

For every month in each time series, a segment was extracted from the time series consisting of a selected month, related previous 6 months and 3 future months. The selected month, related previous 6 months, and future 3 months form a segment and become a row for use in training and testing the models. When the 6 months of previous data, or 3 months of future data equal zero, the segment was excluded from the train/test datasets. In practice, the above segmenting process may be performed by cutting from 1st time point to 10th time point to extract 1st segment, then from 2nd time point to 11th time point to extract 2nd segment, until from 42nd time point to 51st time point to extract 42nd segment. Therefore, for a time series with 51 time points, 42 segments can be extracted, each of which has 10 time points (7 past time points and 3 future time points). Therefore, there were 3276 records in open receivable dataset and 3276 records in revenue dataset before filtering.

As mentioned above, for each time series segment, a filter was applied excluding the time series segment if 6 months of historical data or 3 months of future data equal to 0. Thus, finally there were 1853 records in open receivable dataset and 1669 records in revenue dataset after filtering.

As an example demonstrating how the time series may be constructed following the above process for open receivables, for each of the generated time series, the selected month and related 6 historical time points were selected as input to the model for training and three 'future' time points as targets. The dataset was split into training data and test data. For open receivables this resulted in 1794 training records, and 59 records for test data. For revenue this resulted in 1610 training records, and 59 records for test data. The training data may be used to build the models, and testing data for model evaluation.

In composing the testing data, each records may hold an identical date for the 'selected month.' To achieve this, the last segment for each organization can be used. In this case, it resulted in the 'selected month' of historical financial line item records for training ranging from December 2014 to May 2015 inclusive. The testing data was composed of records where the 'selected month' is June 2015, with prediction targets of July, August, and September. The output was testing data composed of 59 records, representing 59 distinct organizations.

The described DSO forecasting system may be performed on the training data and then applied to the testing data. For the open receivable time series, the multi-organization branch is applied. For the revenue time-series, the multi-organization branch is applied. Within the branch, for signal processing, dimensionality reduction was achieved through the application of the PAC algorithm. The algorithm projected the data to a new lower-dimensional set of features that summarized the original information and through which, better separation and distinguishing of clusters was achieved. For clustering, a density-based algorithm, Gaussian Mixture Model was used. Although the experiment was carried out on only one of the available forecasting branches, the user can select the forecasting branch that is most appropriate.

To enable evaluation of the solution, a single multi-step time series open receivables regression and multi-step time series revenue regression models were built and applied based on the same training and test data as used by the solution. For these models no signal processing and clustering was performed. From the produced open receivable and revenue forecasts, the day sales outstanding forecast is calculated for the required number of future time points. The internal and final prediction produced by the solution are then evaluated against the single regression model results and performance discussed.

Figure 13A:
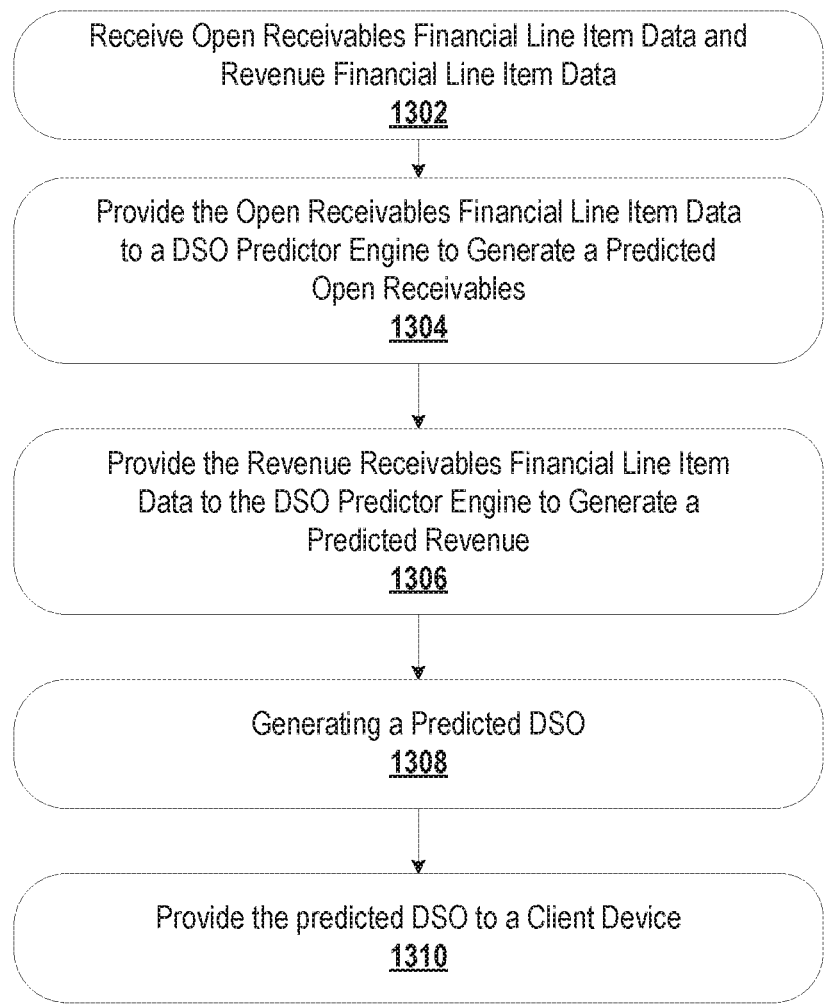
FIG. 13A depicts flow diagram of an example process for generating a predicted DSO with predicted open receivables and predicted revenue to provide to a client device.
Figure 13B:
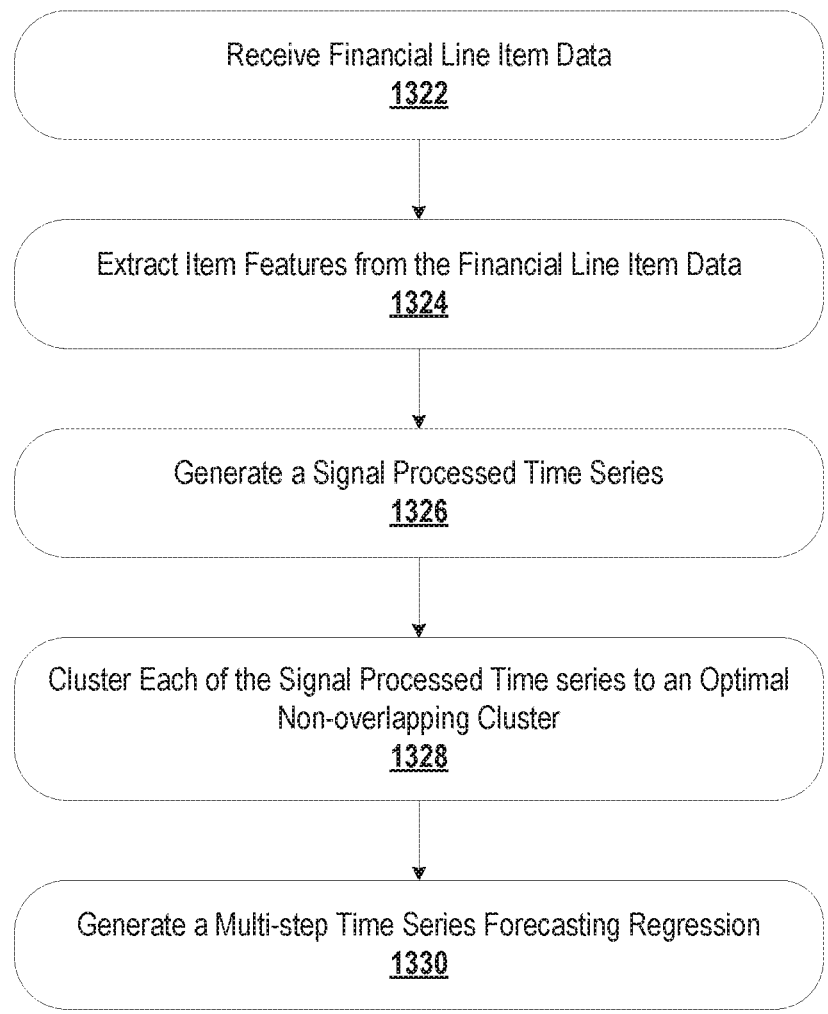
FIG. 13B depicts a flow diagram of an example process may be employed within a DSO predictor engine to generate a multi-step time series forecasting regression

FIGS. 13A and 13B depicts flow diagrams of example processes 1300 and 1320 respectively. Process 1300 may be employed to for generate a predicted DSO with predicted open receivables and predicted revenue to provide to a client device. Process 1320 may be employed within a DSO predictor engine, such as the multiple organization DSO predictor engine 222 and single organization DSO predictor engine 224, to generate a multi-step time series forecasting regression.

For process 1300, at 1302, open receivables financial line item data and revenue financial line item data are received. In some implementations, the open receivables financial line item data includes open receivables that represent sales posted before an end of a selected period that remained open, and revenue financial line item data includes revenue represents sales posted before the end of the selected period including the sales that remained open. From 1302, the process 1300 proceeds to 1304.

At 1304, the open receivables financial line item data are provided to a DSO predictor engine to generate (See process 1320) a predicted open receivables comprising a multi-step time series forecasting regression generated from the open receivables financial line item data. In some implementations, DSO is a KPI that measures an average number of days taken by an organization to collect payment after a sale is made. From 1304, the process 1300 proceeds to 1306.

At 1306, the revenue financial line item data is provided to the DSO predictor engine to generate a predicted revenue comprising the multi-step time series forecasting regression generated from the revenue financial line item data. From 1306, the process 1300 proceeds to 1308.

At 1308, a predicted DSO is generated based on the predicted open receivables and predicted revenue. The predicted DSO includes a vector of final DSO predictions for each future time point. From 1308, the process 1300 proceeds to 1310.

At 1310, the predicted DSO is provided to a client device. From 1310, the process 1300 ends.

For process 1320, at 1322, financial line item data is received from, for example, at step 1304 and 1306 of process 1300. From 1322, the process 1320 proceeds to 1324.

At 1324, item features are extracted from the financial line item data. From 1324, the process 1320 proceeds to 1326.

At 1326, a signal processed time series is generated by applying a signal processing model to identify patterns within the financial line item data and transform the financial line item data in a lower-dimensional space, the signal processing model trained using a historical time series. In some implementations, historical financial line item data is received, the historical time series is extracted from the historical financial line item data, which is employed to train the signal processing model. In some implementations, each of the processed time series has the same segment length as the historical time series. In some implementations, a signal processed historical dataset is generated by transforming the historical time series to another lower-dimensional space of features. In some implementations, the signal processed historical dataset is clustered to determine the optimal non-overlapping clusters and preserve the centroids for each of the optimal non-overlapping clusters. In such implementations, each signal processed historical financial line item from the signal processed historical dataset is associated with one of the optimal non-overlapping clusters. In some implementations, historical financial line item data is received. Historical financial line item features are extracted from the historical financial line item data, each of the historical financial line item features is clustered to one of the optimal non-overlapping cluster, and the regression model for each future time point is generated. In such implementations, a time series of past time points are used as input data and actual values corresponding to current future time point are used as target data. From 1326, the process 1320 proceeds to 1328.

At 1328, each of the signal processed time series is clustered to an optimal non-overlapping cluster. In some implementations, a distance is calculated between each of the signal processed time series and a centroid of each of the optimal non-overlapping clusters to determine the optimal non-overlapping cluster for each of the signal processed time series. In some implementations, the optimal non-overlapping clusters is recalibrated by calculating a validity index and evaluating a compactness of each of the optimal non-overlapping clusters based on the validity indices. From 1328, the process 1320 proceeds to 1330.

At 1330, a multi-step time series forecasting regression is generated by applying a regression model to each future time point in each of the optimal non-overlapping clusters to predict a time series value for each future time point. From 1330, the process 1320 ends.

Figure 14:
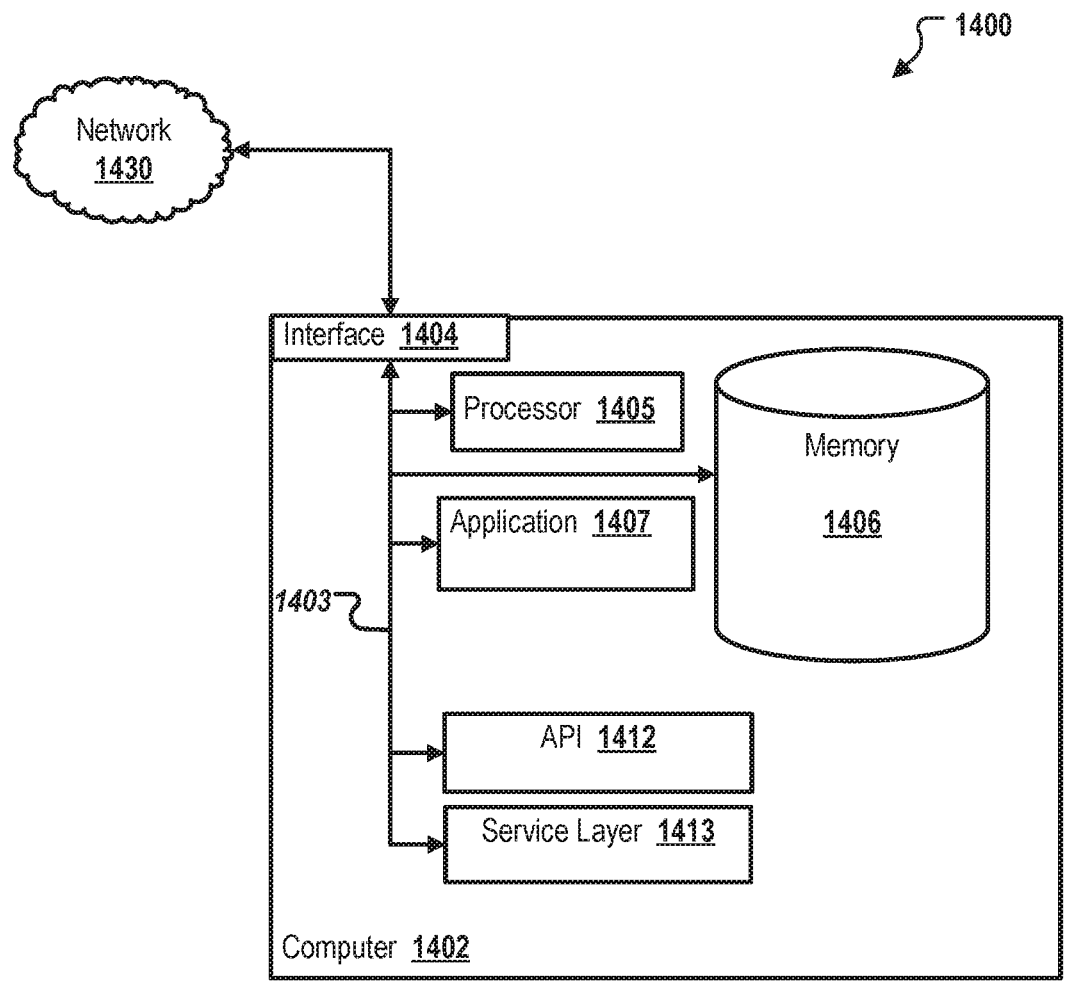
FIG. 14 depicts a block diagram of an exemplary computer system that can be employed to execute implementations of the present disclosure.

FIG. 14 depicts a block diagram of an exemplary computer system 1400 used to provide computational functionalities associated with described algorithms, methods, functions, processes, flows, and procedures as described in the instant disclosure, according to an implementation. The illustrated computer 1402 is intended to encompass any computing device such as a server, desktop computer, laptop or notebook computer, wireless data port, smart phone, personal data assistant (PDA), tablet computing device, one or more processors within these devices, or any other suitable processing device, including both physical or virtual instances (or both) of the computing device. Additionally, the computer 1402 may comprise a computer that includes an input device, such as a keypad, keyboard, touch screen, or other device that can accept user information, and an output device that conveys information associated with the operation of the computer 1402, including digital data, visual, or audio information (or a combination of information), or a graphical user interface (GUI).

The computer 1402 can serve in a role as a client, network component, a server, a database or other persistency, or any other component (or a combination of roles) of a computer system for performing the subject matter described in the instant disclosure. The illustrated computer 1402 is communicably coupled with a network 1430. In some implementations, one or more components of the computer 1402 may be configured to operate within environments, including cloud-computing-based, local, global, or other environment (or a combination of environments).

At a high level, the computer 1402 is an electronic computing device operable to receive, transmit, process, store, or manage data and information associated with the described subject matter. According to some implementations, the computer 1402 may also include or be communicably coupled with an application server, e-mail server, web server, caching server, streaming data server, business intelligence (BI) server, or other server (or a combination of servers).

The computer 1402 can receive requests over network 1430 from a client application (for example, executing on another computer 1402) and responding to the received requests by processing the said requests in an appropriate software application. In addition, requests may also be sent to the computer 1402 from internal users (for example, from a command console or by other appropriate access method), external or third parties, other automated applications, as well as any other appropriate entities, individuals, systems, or computers.

Each of the components of the computer 1402 can communicate using a system bus 1403. In some implementations, any or all of the components of the computer 1402, both hardware or software (or a combination of hardware and software), may interface with each other or the interface 1404 (or a combination of both) over the system bus 1403 using an API 1412 or a service layer 1413 (or a combination of the API 1412 and service layer 1413). The API 1412 may include specifications for routines, data structures, and object classes. The API 1412 may be either computer-language independent or dependent and refer to a complete interface, a single function, or even a set of APIs. The service layer 1413 provides software services to the computer 1402 or other components (whether or not illustrated) that are communicably coupled to the computer 1402. The functionality of the computer 1402 may be accessible for all service consumers using this service layer. Software services, such as those provided by the service layer 1413, provide reusable, defined business functionalities through a defined interface. For example, the interface may be software written in JAVA, C++, or other suitable language providing data in extensible markup language (XML) format or other suitable format. While illustrated as an integrated component of the computer 1402, alternative implementations may illustrate the API 1412 or the service layer 1413 as stand-alone components in relation to other components of the computer 1402 or other components (whether or not illustrated) that are communicably coupled to the computer 1402. Moreover, any or all parts of the API 1412 or the service layer 1413 may be implemented as child or sub-modules of another software module, enterprise application, or hardware module without departing from the scope of this disclosure.

The computer 1402 includes an interface 1404. Although illustrated as a single interface 1404 in FIG. 14, two or more interfaces 1404 may be used according to particular needs, desires, or particular implementations of the computer 1402. The interface 1404 is used by the computer 1402 for communicating with other systems in a distributed environment that are connected to the network 1430 (whether illustrated or not). Generally, the interface 1404 comprises logic encoded in software or hardware (or a combination of software and hardware) and operable to communicate with the network 1430. More specifically, the interface 1404 may comprise software supporting one or more communication protocols associated with communications such that the network 1430 or interface's hardware is operable to communicate physical signals within and outside of the illustrated computer 1402.

The computer 1402 includes a processor 1405. Although illustrated as a single processor 1405 in FIG. 14, two or more processors may be used according to particular needs, desires, or particular implementations of the computer 1402. Generally, the processor 1405 executes instructions and manipulates data to perform the operations of the computer 1402 and any algorithms, methods, functions, processes, flows, and procedures as described in the instant disclosure.

The computer 1402 also includes a memory 1406 that holds data for the computer 1402 or other components (or a combination of both) that can be connected to the network 1430 (whether illustrated or not). For example, memory 1406 can be a database storing data consistent with this disclosure. Although illustrated as a single memory 1406 in FIG. 14, two or more memories may be used according to particular needs, desires, or particular implementations of the computer 1402 and the described functionality. While memory 1406 is illustrated as an integral component of the computer 1402, in alternative implementations, memory 1406 can be external to the computer 1402.

The application 1407 is an algorithmic software engine providing functionality according to particular needs, desires, or particular implementations of the computer 1402, particularly with respect to functionality described in this disclosure. For example, application 1407 can serve as one or more components, modules, applications, etc. Further, although illustrated as a single application 1407, the application 1407 may be implemented as multiple applications 1407 on the computer 1402. In addition, although illustrated as integral to the computer 1402, in alternative implementations, the application 1407 can be external to the computer 1402.

There may be any number of computers 1402 associated with, or external to, a computer system that includes computer 1402, with each computer 1402 communicating over network 1430. Further, the term "client," "user," and other appropriate terminology may be used interchangeably as appropriate without departing from the scope of this disclosure. Moreover, this disclosure contemplates that many users may use one computer 1402, or that one user may use multiple computers 1402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and Compact Disc Read-Only Memory (CD-ROM), Digital Versatile Disk (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A GUI may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a LAN, a radio access network (RAN), a metropolitan area network (MAN), a WAN, Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products. Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for generating a predicted day sales outstanding (DSO), the method being executed by one or more processors and comprising:
   receiving historical financial line item data;
   extracting a historical time series from the historical financial line item data;
   generating and training a signal processing model using the historical time series;
   receiving open receivables financial line item data for transactions that posted before an end of a selected time period for converting open receivables to revenue and that remained open after the selected time period;
   receiving revenue financial line item data;
   providing the open receivables financial line item data to a DSO predictor engine to generate a predicted open receivables comprising a multi-step time series forecasting regression generated from the open receivables financial line item data, wherein the DSO predictor engine performs operations comprising:
      receiving financial line item data;
      extracting item features from the financial line item data;
      generating a signal processed time series by applying the trained signal processing model to identify patterns within the financial line item data and transform the financial line item data in a lower-dimensional space;
      clustering each of the signal processed time series to an optimal non-overlapping cluster;
      training a regression model for each time point in each cluster based on the time series in the cluster; and
      generating the multi-step time series forecasting regression by applying a respective trained regression model to each future time point in each of the optimal non-overlapping clusters to predict a time series value for each future time point;
   providing the revenue financial line item data to the DSO predictor engine to generate a predicted revenue comprising the multi-step time series forecasting regression generated from the revenue financial line item data;
   generating a predicted DSO based on the predicted open receivables and the predicted revenue, wherein the predicted DSO includes a vector of final DSO predictions for each future time point;
   determining that the predicted DSO is greater than a threshold; and
   increasing the selected time period for converting open receivables to revenue based on determining that the predicted DSO is greater than the threshold.

2. The computer-implemented method of claim 1, further comprising:
   calculating a distance between each of the signal processed time series and a centroid of each of the optimal non-overlapping clusters to determine the optimal non-overlapping cluster for each of the signal processed time series.

3. The computer-implemented method of claim 2, further comprising:
   recalibrating the optimal non-overlapping clusters by calculating a validity index and evaluating a compactness of each of the optimal non-overlapping clusters based on the validity indices.

4. The computer-implemented method of claim 2, further comprising:
   generating a signal processed historical dataset by transforming the historical time series to another lower-dimensional space.

5. The computer-implemented method of claim 4, further comprising:
   clustering the signal processed historical dataset to determine the optimal non-overlapping clusters and preserve the centroids for each of the optimal non-overlapping clusters, wherein each signal processed historical financial line item from the signal processed historical dataset is associated with one of the optimal non-overlapping clusters.

6. The computer-implemented method of claim 1, wherein each of the signal processed time series has a same segment length as the historical time series.

7. The computer-implemented method of claim 1, wherein a DSO is a key performance indicator (KPI) that measures an average number of days taken by an organization to collect a payment after a sale is made.

8. The computer-implemented method of claim 1, wherein the open receivables financial line item data includes open receivables that represent sales that posted before an end of a selected period and remained open after the end of the selected period, and wherein the revenue financial line item data includes revenue representing sales posted before the end of the selected period including the sales that remained open.

9. One or more non-transitory computer-readable storage media coupled to one or more processors and having instructions stored thereon which, when executed by the one or more processors, cause the one or more processors to:
   receive historical financial line item data;
   extract a historical time series from the historical financial line item data;
   generate and train a signal processing model using the historical time series;
   receive open receivables financial line item data for transactions that posted before an end of a selected time period for converting open receivables to revenue and that remained open after the selected time period;
   receive revenue financial line item data;
   provide the open receivables financial line item data to a day sales outstanding (DSO) predictor engine to generate a predicted open receivables comprising a multi-step time series forecasting regression generated from the open receivables financial line item data, wherein the DSO predictor engine performs operations comprising:
      receiving financial line item data;
      extracting item features from the financial line item data;

generating a signal processed time series by applying the trained signal processing model to identify patterns within the financial line item data and transform the financial line item data in a lower-dimensional space;

clustering each of the signal processed time series to an optimal non-overlapping cluster;

training a regression model for each time point in each cluster based on the time series in the cluster; and generating the multi-step time series forecasting regression by applying a respective trained regression model to each future time point in each of the optimal non-overlapping clusters to predict a time series value for each future time point;

provide the revenue financial line item data to the DSO predictor engine to generate a predicted revenue comprising the multi-step time series forecasting regression generated from the revenue financial line item data;

generate a predicted DSO based on the predicted open receivables and the predicted revenue, wherein the predicted DSO includes a vector of final DSO predictions for each future time point;

determine that the predicted DSO is greater than a threshold; and increase the selected time period for converting open receivables to revenue based on determining that the predicted DSO is greater than the threshold.

10. The one or more non-transitory computer-readable media of claim 9, further comprising:

calculating a distance between each of the signal processed time series and a centroid of each of the optimal non-overlapping clusters to determine the optimal non-overlapping cluster for each of the signal processed time series.

11. The one or more non-transitory computer-readable media of claim 10, further comprising:

recalibrating the optimal non-overlapping clusters by calculating a validity index and evaluating a compactness of each of the optimal non-overlapping clusters based on the validity indices.

12. The one or more non-transitory computer-readable media of claim 10, further comprising:

generating a signal processed historical dataset by transforming the historical time series to another lower-dimensional space.

13. The one or more non-transitory computer-readable media of claim 12, further comprising:

clustering the signal processed historical dataset to determine the optimal non-overlapping clusters and preserve the centroids for each of the optimal non-overlapping clusters, wherein each signal processed historical financial line item from the signal processed historical dataset is associated with one of the optimal non-overlapping clusters.

14. A day sales outstanding (DSO) forecasting system, comprising:

one or more processors; and a computer-readable storage device coupled to the one or more processors and having instructions stored thereon which, when executed by the one or more processors, cause the one or more processors to:

receive historical financial line item data;

extract a historical time series from the historical financial line item data;

generate and train a signal processing model using the historical time series;

receive open receivables financial line item data for transactions that posted before an end of a selected time period for converting open receivables to revenue and that remained open after the selected time period;

receive revenue financial line item data;

provide the open receivables financial line item data to a DSO predictor engine to generate a predicted open receivables comprising a multi-step time series forecasting regression generated from the open receivables financial line item data, wherein the DSO predictor engine performs operations comprising:

receiving revenue financial line item data;

extracting item features from the financial line item data;

generating a signal processed time series by applying the trained signal processing model to identify patterns within the financial line item data and transform the financial line item data in a lower-dimensional space;

clustering each of the signal processed time series to an optimal non-overlapping cluster;

training a regression model for each time point in each cluster based on the time series in the cluster; and generating the multi-step time series forecasting regression by applying a respective trained regression model to each future time point in each of the optimal non-overlapping clusters to predict a time series value for each future time point;

provide the revenue financial line item data to the DSO predictor engine to generate a predicted revenue comprising the multi-step time series forecasting regression generated from the revenue financial line item data;

generate a predicted DSO based on the predicted open receivables and the predicted revenue, wherein the predicted DSO includes a vector of final DSO predictions for each future time point;

determine that the predicted DSO is greater than a threshold; and increase the selected time period for converting open receivables to revenue based on determining that the predicted DSO is greater than the threshold.

15. The DSO forecasting system of claim 14, wherein a DSO is a key performance indicator that measures an average number of days taken by an organization to collect a payment after a sale is made.

16. The DSO forecasting system of claim 14, wherein the open receivables financial line item data includes open receivables that represent sales that posted before an end of a selected period and remained open after the end of the selected period, and wherein the revenue financial line item data includes revenue representing sales posted before the end of the selected period including the sales that remained open.

* * * * *